(12) United States Patent
Van de Kop et al.

(10) Patent No.: US 10,830,915 B2
(45) Date of Patent: Nov. 10, 2020

(54) METHOD OF DETERMINING SUBSURFACE PROPERTIES USING MULTIFREQUENCY ELECTROMAGNETIC DEPTH SOUNDING

(71) Applicant: EM Locator Technology, LLC, Hot Springs Village, AR (US)

(72) Inventors: Franz Van de Kop, Hot Springs Village, AR (US); Bridget M. Van de Kop, Hot Springs Village, AR (US); Andrew R. Van de Kop, Abbott, TX (US); Juergen Zach, Lafayette, IN (US); Alex C. Dumestre, III, Franklinton, LA (US); David Ridyard, Novato, CA (US); Robert A. Brook, Brazoria, TX (US)

(73) Assignee: EM Locator Technology, LLC, Hot Springs Village, AR (US)

( * ) Notice: Subject to any disclaimer, the term of this patent is extended or adjusted under 35 U.S.C. 154(b) by 329 days.

(21) Appl. No.: 15/886,644

(22) Filed: Feb. 1, 2018

(65) Prior Publication Data
US 2019/0235102 A1 Aug. 1, 2019

(51) Int. Cl.
| | |
|---|---|
| *G01V 1/00* | (2006.01) |
| *G01V 11/00* | (2006.01) |
| *G01V 3/30* | (2006.01) |
| *G01V 1/50* | (2006.01) |
| *G01V 3/12* | (2006.01) |
| *G01V 3/20* | (2006.01) |

(52) U.S. Cl.
CPC ............... *G01V 1/005* (2013.01); *G01V 1/50* (2013.01); *G01V 3/12* (2013.01); *G01V 3/20* (2013.01); *G01V 3/30* (2013.01); *G01V 11/007* (2013.01); *G01V 2210/6163* (2013.01)

(58) Field of Classification Search
CPC . G01V 1/005; G01V 1/50; G01V 3/12; G01V 3/20; G01V 3/30; G01V 11/007; G01V 2210/6163
See application file for complete search history.

(56) References Cited

U.S. PATENT DOCUMENTS 2,642,477 A * 6/1953 Puranen ................. G01V 3/104
324/335
6,188,221 B1 * 2/2001 Van de Kop ............ G01V 3/12
324/334

(Continued)

*Primary Examiner* — Regis J Betsch
(74) *Attorney, Agent, or Firm* — C. Tumey Law Group PLLC

(57) ABSTRACT

The present disclosure relates to detecting subterranean formations using electromagnetic depth sounding. A method for detecting formation properties may comprise of disposing a transmitter at a surface, disposing a receiver at the surface, coupling a high frequency wave to a low frequency wave to form an electromagnetic pulse, transmitting the electromagnetic pulse into a formation from the transmitter, receiving a reflected electromagnetic wave from the formation with the receiver, and determining the depth and nature of the formation from the surface. A formation measuring system may comprise a transmitter, wherein the transmitter is configured to couple a high frequency wave to a low frequency wave to form an electromagnetic pulse. The formation measuring system may further comprise at least one receiver, a data acquisition system, and an analysis unit.

18 Claims, 13 Drawing Sheets

(56) References Cited

U.S. PATENT DOCUMENTS 6,864,826 B1  3/2005  Stove
2002/0181326 A1* 12/2002 Hornbostel ............ G01V 1/003
                                                    367/14
2013/0146756 A1* 6/2013 Schmidt .................. G01V 3/12
                                                    250/264

* cited by examiner

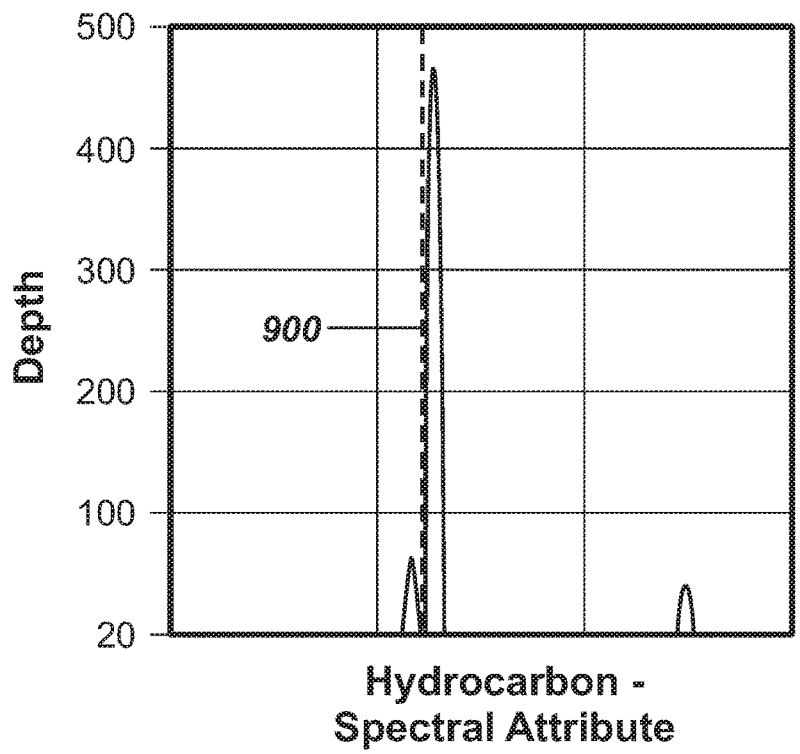
FIG. 11
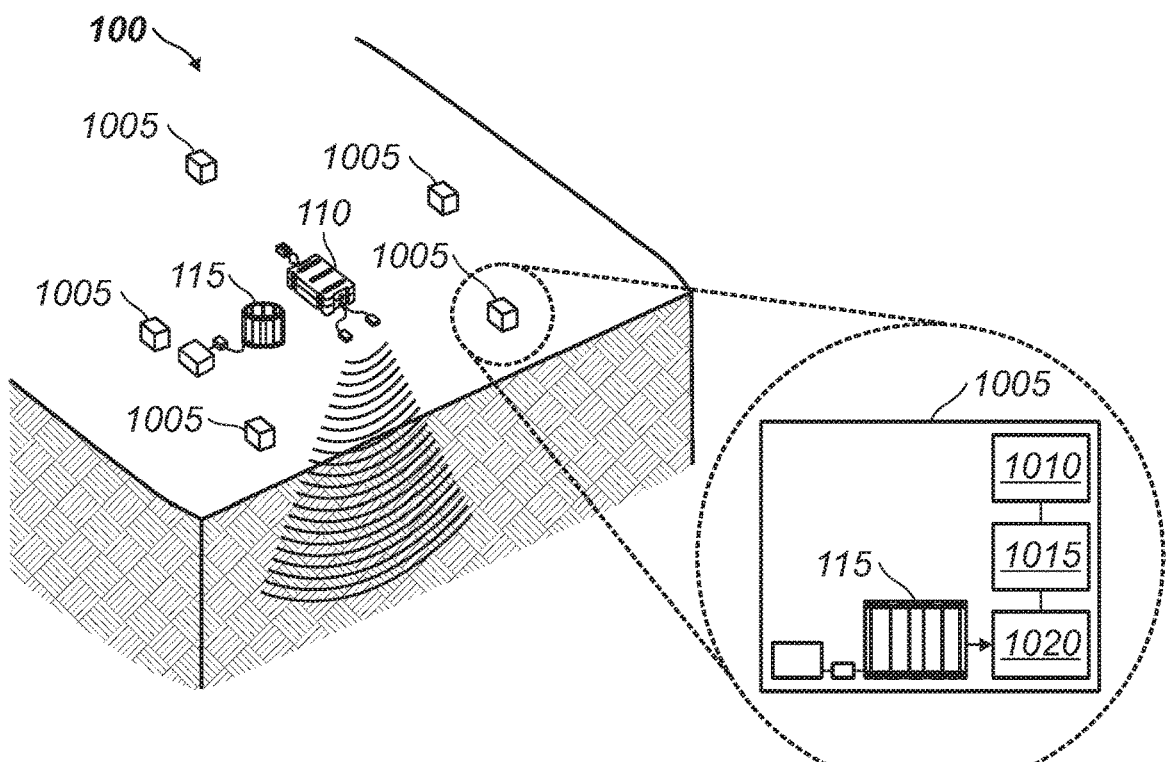
FIG. 12A
FIG. 12B

METHOD OF DETERMINING SUBSURFACE PROPERTIES USING MULTIFREQUENCY ELECTROMAGNETIC DEPTH SOUNDING

BACKGROUND OF THE INVENTION

Drilling into a subterranean formation may be required to facilitate the removal of minerals, fluids, gases, oil, and other valuable resources. Knowledge of the location of subterranean formations may be desirable to anticipate a successful well. Often, when boreholes are drilled, only a narrow, vertical column of the Earth's subsurface conveys information concerning subterranean formations. Ground-based remote sensing methods may offer a less expensive way to detect subterranean formations and may provide information spanning over a larger area than a borehole.

Currently, seismic, electromagnetic, or resistivity devices and methods have been used to locate subterranean formations. These traditional devices and methods have drawbacks. For example, transmitting and receiving seismic waves produces information on the structure of a formation, but does not reliably yield comprehensive information on the geological deposits (whether the formation contains oil, gas, brine, etc.). Transmitting and receiving electromagnetic waves has a trade-off between resolution and depth of investigation. Electromagnetic methods, which operate either purely in the frequency- or in the time-domain, may explore deeper depths with poor resolution or at a shallower depth with high resolution. Classical DC resistivity is limited to very shallow depths of investigation, as it carries no depth information, neither in the frequency-domain nor in the time-domain. A system and method that may measure at a deep depth with high resolution and distinguish the geological deposits within formations would be desirable.

For example, a ground-based remote sensing system may be desirable over traditional devices and methods. Specifically, a ground-based remote sensing system that detects specific formations may allow for near real time information as to the location and geological make-up of specific formations. A ground-based remote sensing system may further process data to display results to an operator. Results may be displayed in the form of graphs, images, models, simulations, numbers, and/or combinations thereof. A ground-based remote sensing system may be easy to construct and cheap to operate, when compared to current devices and methods for detecting formations. Resulting product quality may be enhanced by the ability to locate both hydrocarbons and aquifers simultaneously. Additionally, a ground-based remote sensing system may be more efficient with the ability to take a "quick look' in the field which may allow concentration on prospective areas.

BRIEF DESCRIPTION OF THE DRAWINGS

For a detailed description of the preferred embodiments of the invention, reference will now be made to the accompanying drawings in which:

FIG. 11 illustrates a graph depicting a hydrocarbon spectral attribute;

FIG. 12A illustrates an embodiment of a formation measuring system;

FIG. 12B illustrates an embodiment of a formation measuring system;

DETAILED DESCRIPTION OF THE PREFERRED EMBODIMENTS

The present disclosure relates to embodiments of a ground-based remote sensing system and method for detecting subterranean formations. Subterranean formations may be any suitable structure that consists of a certain number of rock strata that may have a comparable lithology, facies, and/or other similar properties. Subterranean formations may be any suitable shape and/or thickness and may be located below the Earth's surface. Without limitation, subterranean formations may comprise of oil, natural gas, water, air, mineral ore, rock, and/or combinations thereof.

Figure 1:
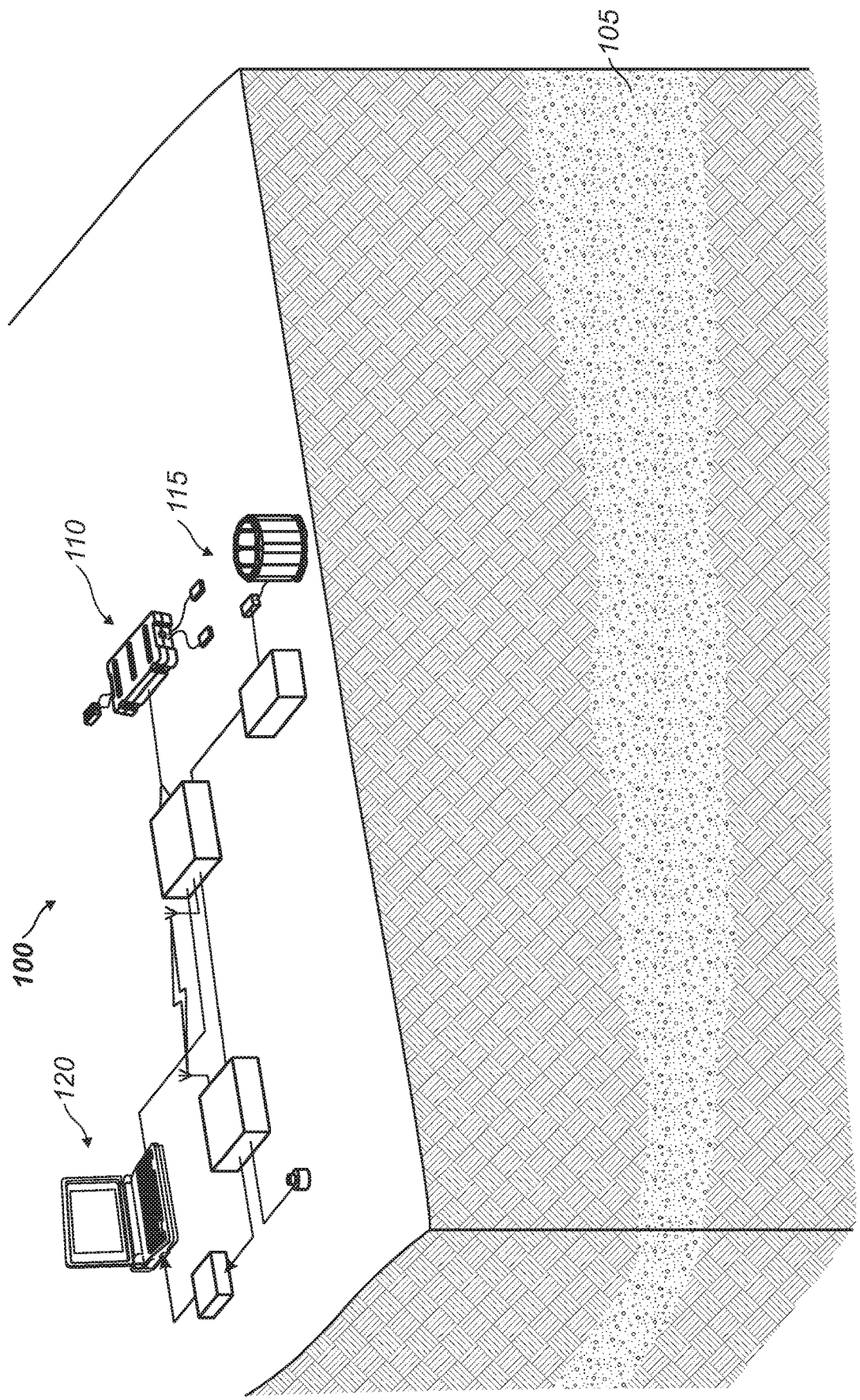
FIG. 1 illustrates an embodiment of a formation measuring system measuring a formation.

FIG. 1 illustrates an embodiment of a formation measuring system 100. Without limitation, formation measuring system 100 may be disposed on the Earth's surface, above the Earth's surface, at a subsurface location, and/or combinations thereof. Formation measuring system 100 may be disposed on suitable equipment allowing formation measuring system 100 to be portable. In embodiments, formation measuring system 100 may be disposed in a vehicle. Without limitation, formation measuring system 200 may be disposed in a trailer, a sled, a mobile platform, and/or combinations thereof. In embodiments, formation measuring system 100 may be disposed vertically in relation to a subterranean formation 105 or at an angle with subterranean formation 105. It should be noted that, there may be a plurality of subterranean formations 105 within a selected location for surveying. In embodiments, formation measuring system 100 may comprise of a transmitter 110, a receiver 115, and an analysis unit 120.

The equipment used within the disclosed system and method may be portable and have low-impact on the environment. As opposed to some seismic and electromagnetic equipment, which may require loud generators, the disclosed system and method may not produce noise pollution, and there may be little to no risk to humans and wildlife outside a very small radius around the equipment.

The portability of formation measuring system 100 may allow for easy setup for time-lapse applications or 4D-monitoring applications in any terrain. The disclosed system and method may be capable of monitoring changes in the subsurface without the need to set up large arrays of receivers and transmitters as found in current electromagnetic systems and methods.

Figure 2:
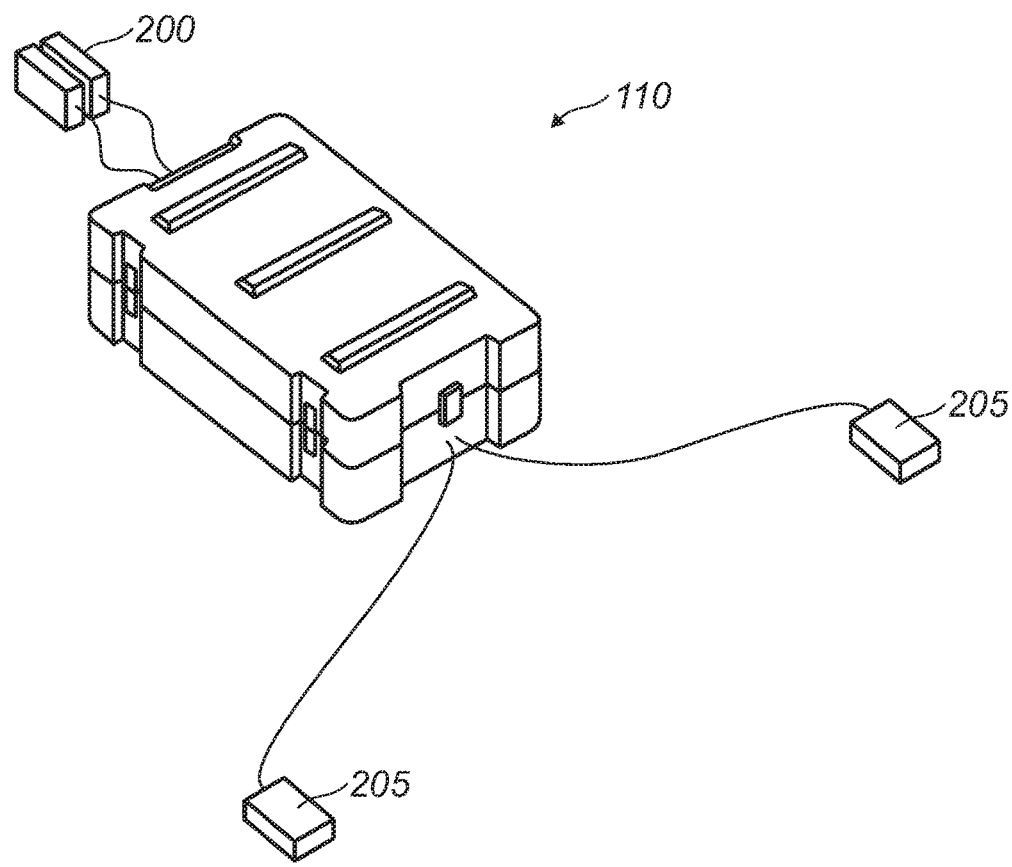
FIG. 2 illustrates an embodiment of a transmitter.

FIG. 2 illustrates an embodiment of transmitter 110. Transmitter 110 may comprise a power supply 200 and at least one ground coupling 205. Internal components of transmitter 110 may include a capacitor, a spark gap switch, and a resistor. The components within transmitter 110 may be directly and/or indirectly coupled to one another through electrically conductive wires. During operations, transmitter 110 may be energized by power supply 200 to produce an electromagnetic pulse, as discussed below.

Power supply 200 may be any suitable electrical device capable of supplying electrical energy to an electrical load. Without limitation, power supply 200 may be a DC power supply, an AC power supply, a switched-mode power supply, a programmable power supply, an uninterrupted power supply, a high-voltage power supply, and/or combinations thereof. In embodiments, power supply 200 may be an electrical generator and/or battery. In embodiments, power supply 200 may comprise two 12 V batteries. During operations, power supply 200 may charge the capacitor.

The capacitor may be able to store electrical energy when connected to a charging circuit. When disconnected from this circuit, the capacitor may be able to dissipate the stored electrical energy. There may be a plurality of capacitors. In embodiments, a plurality of capacitors may form a capacitor bank. Without limitation, the orientation of the capacitors within the capacitor bank may be in series, parallel, and/or combinations thereof. A capacitor bank may be implemented to produce the desired electromagnetic pulse as the stored electrical energy dissipates. The capacitor banks may be advantageous in that they may produce a high-voltage pulse upon discharge from a supplied low-voltage power source. In embodiments, formation measuring system 100 (referring to FIG. 1) may be transportable. Power supply 200 may also be transportable. Power supply 200 may have a limited voltage capacity since power supply may not be connected to a power grid. In embodiments, 12 V batteries may supply a capacitor bank with electrical energy. Upon discharge, the capacitor bank may produce an electromagnetic pulse with a voltage greater than that of the supplied power.

Without limitation, the capacitor may be any selected from the group of ceramic capacitors, film capacitors, power film capacitors, electrolytic capacitors, supercapacitors, and/or other miscellaneous capacitors. Without limitation, the capacitor may have a capacitance within a range of about 1 nF to about 10 nF. For example, the range may be from about 1 nF to about 3 nF, about 3 nF to about 6 nF, and about 6 nF to about 10 nF. In other embodiments, the capacitance may range from about 10 nF to about 1 µF, or from about 1 µF to about 1000 µF, or from about 1000 µF to about 1 F. In embodiments, as power supply 200 supplies energy to the capacitor, a threshold voltage value of the capacitor may be reached. As the threshold is reached, the capacitor may discharge its stored electrical energy. To initiate discharge, the spark gap switch may be activated.

The spark gap switch may be a high-energy triggerable spark gap used to rapidly switch high voltages and high currents for pulsed applications. In other embodiments, the switching may be conducted by measuring the voltage through an analog or digital voltage meter, and the switch may be any electromechanical relay or solid-state relay. There may be a plurality of spark gap switches. Without limitation, the spark gap switch may be a positive pressure gap and/or a triggered vacuum gap. The spark gap switch may be manually actuated and/or may be automated to actuate at a specified voltage. In embodiments, the spark gap switch may be any other switch, including electromechanical relays or solid-state relays, which may be activated by a system which measures the voltage and actuates the switch. In embodiments, a plurality of capacitors may be charged in parallel. The spark gap switch may be actuated to cause the plurality of capacitors to discharge in series, parallel, and/or combinations thereof. The resulting discharge of electrical energy may be transferred to the resistor.

The resistor may impose an electrical resistance within a circuit path. In embodiments, the resistor may be coupled with the capacitor to form an RC circuit that acts as a voltage divider and may or may not become part of a pulse forming network. Without limitation, other passive, two-terminal electrical components may be used in various configurations to implement similar outcomes. As the discharged electrical energy from the capacitor flows to the resistor, the output voltage from the capacitor is reduced to a lesser value as the voltage leaves the resistor. The resistor may be either a fixed resistor or a variable resistor. Without limitation, the resistor may have a resistance within a range of about 2Ω to about 200Ω. For example, the range may be from about 2Ω to about 70Ω, from about 70Ω to about 130Ω, and from about 130Ω to about 200Ω. Alternatively, the resistance may be any suitable value, for example, smaller than 2Ω, or greater than 200Ω. In embodiments, the output voltage from the resistor may travel into the Earth's surface through ground coupling 205.

Ground coupling 205 may electrically and/or mechanically couple transmitter 110 to the Earth's surface. Without limitation, ground coupling 205 may comprise an electrode, an inductive loop, and/or a base plate (not illustrated). Ground coupling 205 may enable a constant potential reference for measuring purposes. By connecting transmitter 110 to the Earth's surface, an infinite source or sink may be idealized for charge, wherein the Earth may absorb an unlimited amount of current without changing its potential. Ground coupling 205 may comprise of a conductive material, insulation, wiring, and/or any combinations thereof. The wiring may couple the conductive material to transmitter 110. Insulation may be disposed around the wiring to prevent electrical discharge as current flows through the wiring. The conductive material may expel the current from transmitter 110 into the Earth through inductive coupling. The conductive material may be any suitable size, height, and shape. In embodiments, the conductive material may be any suitable material capable of conducting an electrical current. The conductive material may be coupled to transmitter 110 through a mechanical linkage with suitable fasteners. A mechanical linkage may be an assembly of bodies connected to manage forces and moments. Without limitation, suitable fasteners may include nuts and bolts, washers, screws, pins, sockets, rods and studs, hinges and/or any combination thereof. In embodiments, ground coupling 205 may be internal to transmitter 110 and across the resistor. The electromagnetic field that ground coupling 205 may create may be coupled to the ground through the electrode.

The electrode may be able to transfer the output voltage from the resistor disposed in transmitter 110 into the Earth's surface. In embodiments, if the electrode is used, the resistor may be in series, parallel, and/or combinations thereof in the circuit relative to the electrode. The electrode may be a monopole, dipole, and/or any combinations thereof. In embodiments, there may be a plurality of electrodes. The plurality of electrodes may be disposed in any configuration on the Earth's surface. Additionally, the plurality of electrodes may be coupled to the resistor through electrically conductive wiring. During operations, as the output voltage from the plurality of electrodes travels into the Earth's surface, a current may be produced. The current may subsequently produce an electromagnetic field. As the induced current may be time-dependent, the electromagnetic field may pulsate in periods of time (e.g. an electromagnetic pulse). In operations, electrical energy may by supplied to transmitter 110, flow through transmitter 110, and discharge as an electromagnetic pulse, as discussed below.

During operations in which an inductive loop may be utilized, the inductive loop may be directly coupled to transmitter 110. The inductive loop may be a separate, attachable cable configured to produce an electromagnetic pulse (discussed below). The current in the inductive loop may produce an electromagnetic field which may be coupled to the ground. Without limitation, the electromagnetic field may vertically penetrate the surface. The inductive loop may be a high-voltage, encapsulated, current carrying conductor, which may be deployed on rocks, gravel, sand or other highly resistive surfaces. Without limitation, the inductive loop may be an insulated thicker-gauge copper wire and may be insulated with a resistive material with a large dielectric breakthrough voltage. The inductive loop may be arranged into any shape upon the Earth's surface. In embodiments, the inductive loop may be arranged in a circle. Without limitation, the inductive loop may have a length within a range of about 10 feet to about 220 feet. For example, the range may be from about 10 feet to about 80 feet, about 80 feet to about 150 feet, and about 150 feet to about 220 feet.

During operation of formation measuring system 100 (referring to FIG. 1), power supply 200 may charge a plurality of capacitors (e.g. a capacitor bank) to a threshold voltage. The spark gap switch may be actuated to discharge the stored energy within the plurality of capacitors. The output energy may be adjusted by changing the spark gap switch. The output energy may experience a voltage divider comprised by the Earth and a resistor, or any other passive two-terminal element designed to help shape the discharge curve, in series, decreasing the magnitude of the output energy. The output energy may be transmitted to the Earth's surface through at least one ground coupling 205 as an electromagnetic pulse (described below). The electromagnetic pulse may be time-dependent as the plurality of capacitors discharge. Without limitation, the magnitude of the electromagnetic pulse may decrease over a period of time within a range of about 1 microsecond to about 1 second. For example, the range may be from about 1 microsecond to about 100 microseconds, from about 100 microseconds to about 1 centisecond, or from about 1 centisecond to about 1 second. In embodiments, at least one ground coupling 205 may be disposed in soil to produce an electromagnetic pulse that may traverse the maximum depth of investigation. The soil's resistance may be measured prior to disposing the plurality of electrodes 210 onto the Earth's surface. If the resistance is greater than a specific value, the inductive loop may be employed. Without limitation, the specific value of the ground resistance may be greater than 20 Ohm to 10,000 Ohm. For example it may be greater than 20 Ohm to 100 Ohm, or 100 Ohm to 1,000 Ohm, or 1000 Ohm to 10,000 Ohm. In embodiments, after transmitter 110 produces an electromagnetic pulse, receiver 115 (referring to FIG. 1) may receive and process electromagnetic waves that may be subsequently reflected and/or created when the electromagnetic pulse interacts with subterranean formations 105 (referring to FIG. 1).

Figure 3:
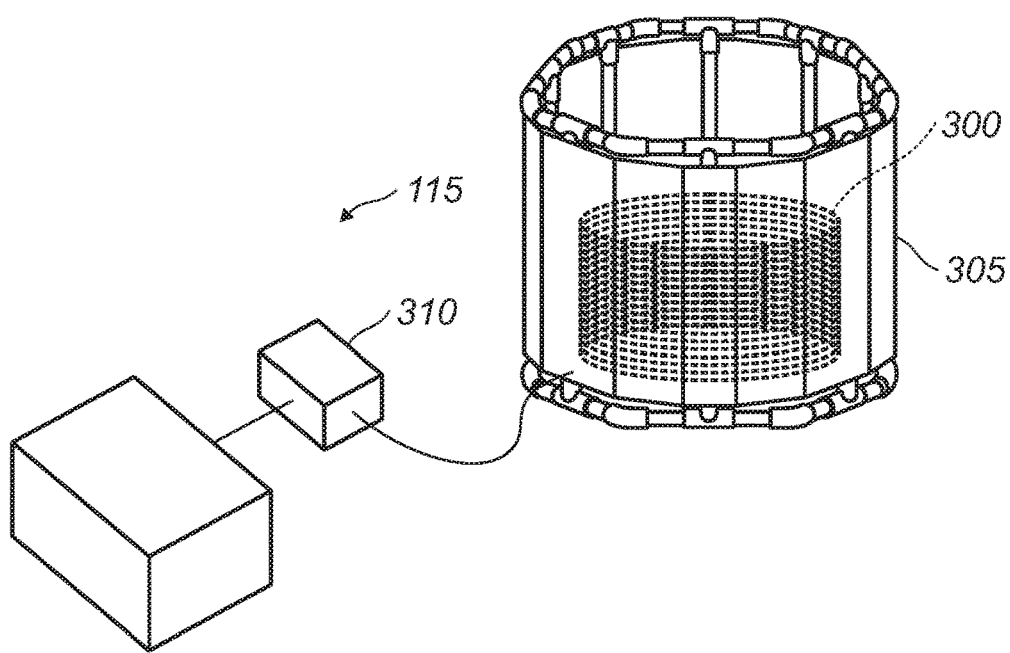
FIG. 3 illustrates an embodiment of a receiver.

FIG. 3 illustrates an embodiment of receiver 115. Receiver 115 may comprise a sensor coil 300, a frame 305, and a built-in attenuator 310. The components within receiver 115 may be directly and/or indirectly coupled to one another through electrically conductive wires. Receiver 115 may operate to receive electromagnetic waves and convert them into data, wherein the electromagnetic waves may be low and/or high frequency waves reflected off of, or created within, subterranean formation 105 as the electromagnetic pulse interacts with subterranean formation 105 (referring to FIG. 1).

In embodiments, sensor coil 300 may be designed to capture electromagnetic waves. Sensor coil 300 may be designed to capture the electromagnetic waves coming from a singular direction and/or multiple directions. In embodiments, sensor coil 300 may capture reflected electromagnetic waves arriving from a vertical direction. Sensor coil 300 may not sense the reflected electromagnetic waves or ground-based electromagnetic interference arriving from a direction within the horizontal plane. In embodiments, if sensor coil 300 senses components of the reflected electromagnetic waves that arrive from the horizontal plane, those components of the reflected electromagnetic waves may be removed during data processing. Without limitation, there may be a plurality of sensor coils 300 employed within receiver 115. Sensor coil 300 may be disposed on the Earth's surface, below the Earth's surface, or above the Earth's surface. In embodiments, sensor coil 300 may be disposed within frame 305.

Frame 305 may serve to house and protect sensor coil 300 from the external environment. Frame 305 may partially or completely shield sensor coil 300 from outside elements and may be any suitable size, height, or shape. Without limitation, frame 305 may comprise any suitable material such as metal, plastic, an alloy, or any combination thereof. Frame 305 may comprise individual members disposed upon each other through suitable means. Without limitation, suitable means may include nuts and bolts, washers, screws, pins, sockets, rods and studs, hinges, adhesives, threading, welding, and/or any combination thereof. In embodiments, an attenuator 310 may be built into receiver 115 and may be disposed upon frame 305 and/or adjacent to frame 305.

Attenuator 310 may lower the amplitude of an incoming reflected electromagnetic wave to enable data processing. In embodiments, there may be a plurality of attenuators 310. By lowering the amplitude of an incoming reflected electromagnetic wave, formation measuring system 100 (referring to FIG. 1) may be able to process more information. Attenuator 310 may reduce the power of an incoming signal without distorting the signal's waveform. Electronics and/or electrical circuits may not be able to process, or register, signals of a high amplitude. Attenuator 310 may be implemented to lower the amplitude of an incoming high frequency signal to a lower amplitude that may allow the high frequency signal to register with receiver 115. Without limitation, individual components of receiver 115 may allow formation measuring system 100 (referring to FIG. 1) to process measurements induced by transmitter 110. In other embodiments in which the measured amplitude is small, the attenuator may be replaced by an amplifier to increase the amplitude of an incoming signal to enable formation measuring system 100 (referring to FIG. 1) to process the information.

Figure 4:
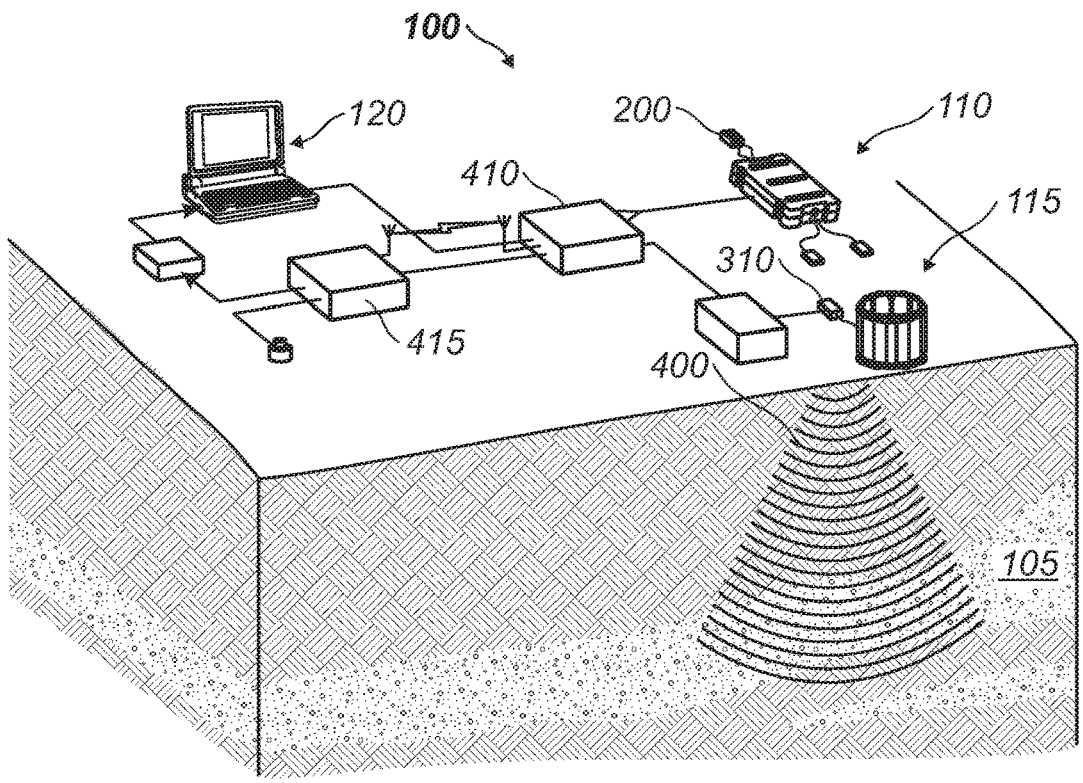
FIG. 4 illustrates an embodiment of a formation measuring system in exploratory operation.
Figure 5:
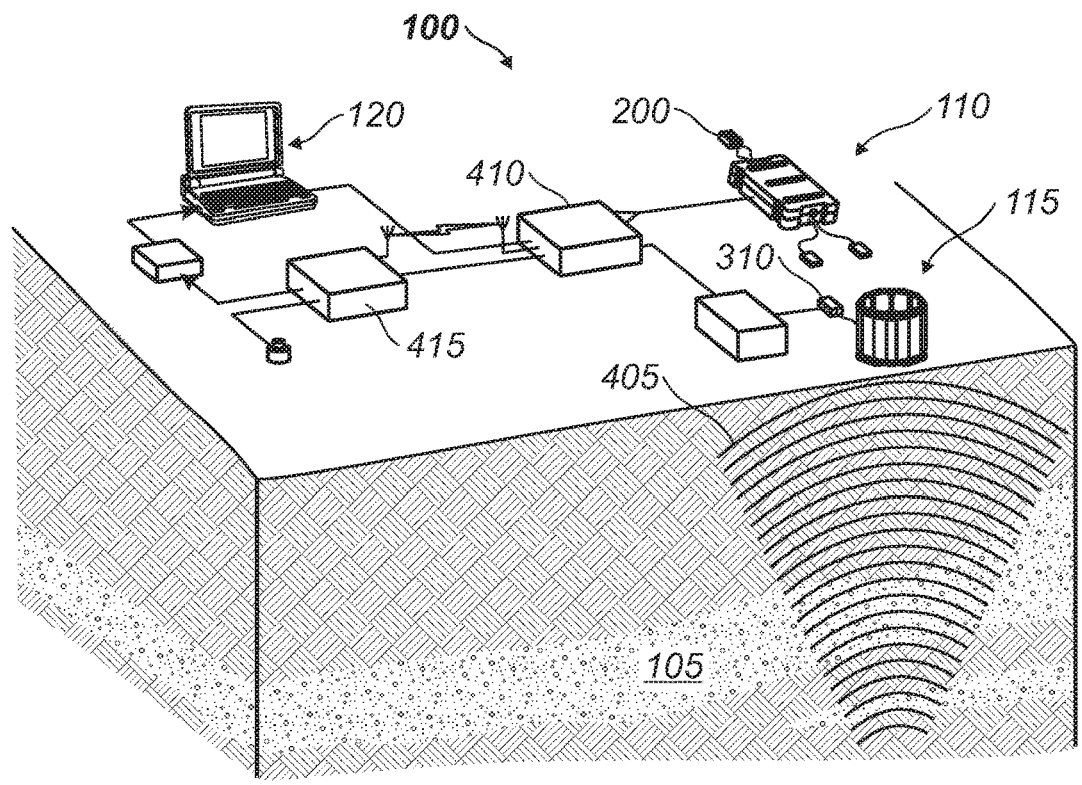
FIG. 5 illustrates an embodiment of a formation measuring system in exploratory operation.

FIGS. 4 and 5 illustrate an embodiment of transmitter 110 and receiver 115 in an exploration operation. In embodiments, transmitter 110 may be disposed within a suitable length away from receiver 115. In embodiments, a suitable length may be from about 0.5 meters to about 100 meters. Without limitation, the length may be from about 0.5 meters to about 2.5 meters, from about 2.5 meters to about 5 meters, from about 5 meters to about 7.5 meters, from about 7.5 meters to about 10 meters, and from about 10 meters to about 100 meters. The suitable length between transmitter 110 and receiver 115 may be correlated to the direct coupling, through the air, between transmitter 110 and receiver 115. In embodiments, the depth of investigation may be from about 0 feet to about 10,000 feet. Without limitation, the depth of investigation may be from about 0 feet to about 2,500 feet, from about 2,500 feet to about 5,000 feet, from about 5,000 feet to about 7,500 feet, and from about 7,500 feet to about 10,000 feet. In other embodiments, the depth of investigation may also be greater than 10,000 feet.

In embodiments, there may be a plurality of transmitters 110 and/or receivers 115. A plurality of receivers 115 may be disposed in any suitable arrangement around and/or away from transmitter 110. In embodiments, the plurality of receivers 115 may be arranged in a linear fashion or in a circle equidistant from transmitter 110. In other embodiments, the plurality of receivers 115 may be over 100 meters away from transmitter 110. During operations, a first receiver and a second receiver may be utilized to determine a propagation speed of an electromagnetic pulse (as discussed below). The second receiver may be disposed at a distance further away from transmitter 110 than the first receiver in order to calculate the propagation speed of an electromagnetic pulse. In alternate embodiments, a single transmitter 110 may abut a surface of receiver 115, rather than there be a distance between them. In embodiments, transmitter 110 may be coupled wirelessly to receiver 115 through analysis unit 120.

Without limitation, analysis unit 120 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, analysis unit 120 may be a personal computer, a network storage device, or any other suitable device and may vary in size, shape, performance, functionality, and price. In embodiments, analysis unit 120 may be a laptop computer. Analysis unit 120 may include random access memory (RAM), one or more processing resources such as a central processing unit (CPU) or hardware or software control logic, ROM, and/or other types of nonvolatile memory. Additional components of analysis unit 120 may include one or more disk drives, one or more network ports for communication with external devices as well as various input and output (I/O) devices, such as a keyboard, a mouse, and a visual display. In embodiments, a visual display may include formation 105 displayed as a 2D image or a 3D image. Analysis unit 120 may also include one or more buses operable to transmit communications between the various hardware components through wired or wireless protocols.

Certain examples of the present disclosure may be implemented at least in part with non-transitory computer-readable media. For the purposes of this disclosure, non-transitory computer-readable media may include any instrumentality or aggregation of instrumentalities that may retain data and/or instructions for a period of time. Non-transitory computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media to access said non-transitory computer-readable media such as wires, optical fibers, microwaves, radio waves, and other electromagnetic and/or optical carriers; and/or any combination of the foregoing.

Analysis unit 120 may command power supply 200 to energize transmitter 110 to produce an electromagnetic pulse 400. During operations, analysis unit 120 may command receiver 115 to record a reflected electromagnetic wave 405 and to convert reflected electromagnetic wave 405 into data to be manipulated by analysis unit 120. Analysis unit 120 may operate receiver 115 continuously throughout operation or initiate exploration operations when transmitter 110 produces electromagnetic pulse 400. In embodiments, as transmitter 110 produces electromagnetic pulse 400, the leading edge of electromagnetic pulse 400 may create a trigger pulse. The trigger pulse may initiate formation measuring system 100 to start taking measurements. An operator may manipulate and analyze the collected data to produce a visual representation of the properties within subterranean formation 105. In embodiments, analysis unit 120 may communicate with a data acquisition system 410 and a controller 415. Data acquisition system 410 and controller 415 may be coupled through wires or wirelessly. Without limitation, they may be coupled through suitable wiring, a fiber optic cable, a wireless connection, and/or combinations thereof.

The controller 415 may be a control module, which may comprise software programmable to operate formation measuring system 100. Controller 410 may control the rate and the number of electromagnetic pulses 400 being transmitted into the Earth's surface. Data acquisition system 410, controller 415, transmitter 110, and receiver 115 may all be powered by at least one power source separate from power supply 200. For example, the power source may be a generator and/or batteries. Furthermore, controller 415 may activate attenuator 310 to reduce the incoming wave's amplitude.

Data acquisition system 410 may comprise a digitizer, or analog-to-digital converter. The digitizer may digitize the reflected electromagnetic wave's information. The digitizer may comprise of any suitable hardware and/or software to capture a digital representation of the time series of the received data and enable the processes of discretization and quantization. The digital data may then be manipulated and analyzed by analysis unit 120.

Analysis unit 120 and controller 415 may be powered by the same, or by different power sources. In embodiments, the power source may be integrated into controller 415. In other embodiments, controller 415 may be coupled to an external power source. In embodiments, the external power source may be the battery of a vehicle. Controller 415 may use that external power source to provide analysis unit 120 with AC power.

In embodiments, formation measuring system 100 may be disposed on the Earth's surface. An operator may activate transmitter 110 to produce electromagnetic pulse 400 to acquire data concerning a potential location for at least one of subterranean formations 105. Electromagnetic pulse 400 may be a combination of at least one low frequency wave and at least one high frequency wave created simultaneously by transmitter 110. A plurality of electromagnetic pulses 400 may be generated, wherein controller 415 may control the rate and number of electromagnetic pulses 400 emitted from transmitter 110. As electromagnetic pulse 400 is generated, a triggered pulse may initiate formation measuring system 100 to start taking measurements. The controller 415 may receive the triggered pulse and activate receiver 115. Electromagnetic pulse 400 may travel in a direction towards subterranean formation 105.

More particularly, embodiments of a system and method may induce electromagnetic pulses into the ground. Without limitation, an electromagnetic pulse may be any energy wave that comprises at least one low frequency wave that may carry at least one higher frequency wave across a distance. In embodiments, a suitable low frequency wave may be any wave with a frequency within the range of about 1 Hz to about 30 MHz. Without limitation, depending on the depth of investigation, the range may be from about 1 Hz to about 100 Hz, from about 100 Hz to about 10 kHz, from about 10 kHz to about 1 MHz, or from about 1 MHz to about 30 MHz. In embodiments, a suitable high frequency wave may be any wave with a frequency within the range of from about 1 kHz to about 150 MHz. Without limitation, the range may be from about 1 kHz to about 100 kHz, from about 100 kHz to about 10 MHz, or from about 10 MHz to about 150 MHz.

In embodiments, a transmitter may produce an electromagnetic pulse. Both the high frequency waves and the low frequency waves may be reflected back to the surface by a subterranean formation 105. In embodiments, the electromagnetic pulse may comprise at least one low frequency wave that may be superimposed with the at least one higher frequency wave. Without limitation, there may be a plurality of low frequency waves and/or high frequency waves, which may be created simultaneously at the transmitter within the electromagnetic pulse. The electromagnetic pulse may travel to a greater depth of investigation than traditional high frequency electromagnetic waves due to the presence of low-frequency components in the pulse, and may generate higher resolution information than traditional low frequency electromagnetic waves due to the separation in their time-domains. The electromagnetic pulse may interact with subterranean formation 105. Both the low frequency waves and the at least one high frequency wave may be partially reflected back into the direction of the surface. In other embodiments, a separate high-frequency wave with a different frequency may be created by the interaction of the low frequency waves and the at least one high frequency waves with the subsurface. The separate high-frequency wave may superimpose on the reflected parts of the low frequency waves and the at least one high frequency waves. Low frequency waves and/or high frequency waves and/or separate high-frequency waves may be reflected based on the composition and properties of the corresponding subterranean formation 105 encountered. The low and/or at least one high frequency wave may be recorded at the surface, and the data may be processed to determine properties of subterranean formation 105 that had interacted with the electromagnetic pulse.

As electromagnetic pulse 400 interacts with subterranean formation 105, a portion of a plurality of low frequency waves and/or high frequency waves may be reflected back to formation measuring system 100 as reflected electromagnetic wave 405. In embodiments, depending on the composition of subterranean formation 105, at least one additional high frequency wave may be generated due to inelastic interactions between the electromagnetic energy of electromagnetic pulse 400 and subterranean formation 105. The additional high frequency wave may be reflected back to the surface. In other embodiments, at least one wave with a low frequency or high frequency may selectively interact with a subsurface layer in subterranean formation 105 and be either selectively absorbed or reflected by subterranean formation 105, wherein the remaining low and/or high frequency waves within the electromagnetic pulse may be reflected back towards formation measuring system 100 as reflected electromagnetic wave 405. Receiver 115 may receive reflected electromagnetic wave 405, wherein the data acquisition unit 410 may digitize the information from reflected electromagnetic wave 405. The digitized information may be transferred to analysis unit 120, wherein the operator may manipulate and analyze the digitized information. In other embodiments, the digitized information may be analyzed by an algorithm. Analysis unit 120 may utilize the digitized information to compute a propagation speed of the electromagnetic pulse, which in turn is used in calculating the depth and composition of a potential location for subterranean formation 105. Without limitation, the composition of subterranean formation 105 may comprise oil, natural gas, water, air, mineral ore, rock, and/or combinations thereof.

Figure 6:
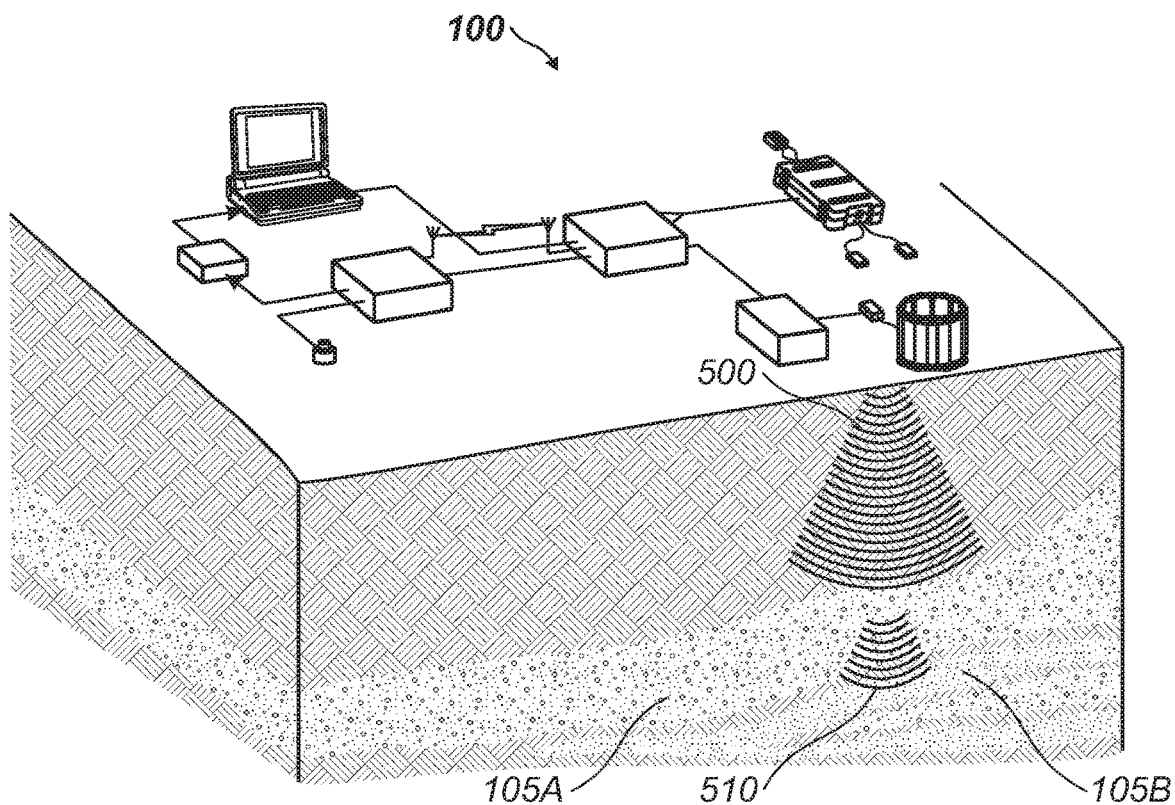
FIG. 6 illustrates an embodiment of a formation measuring system measuring multiple formations.
Figure 7:
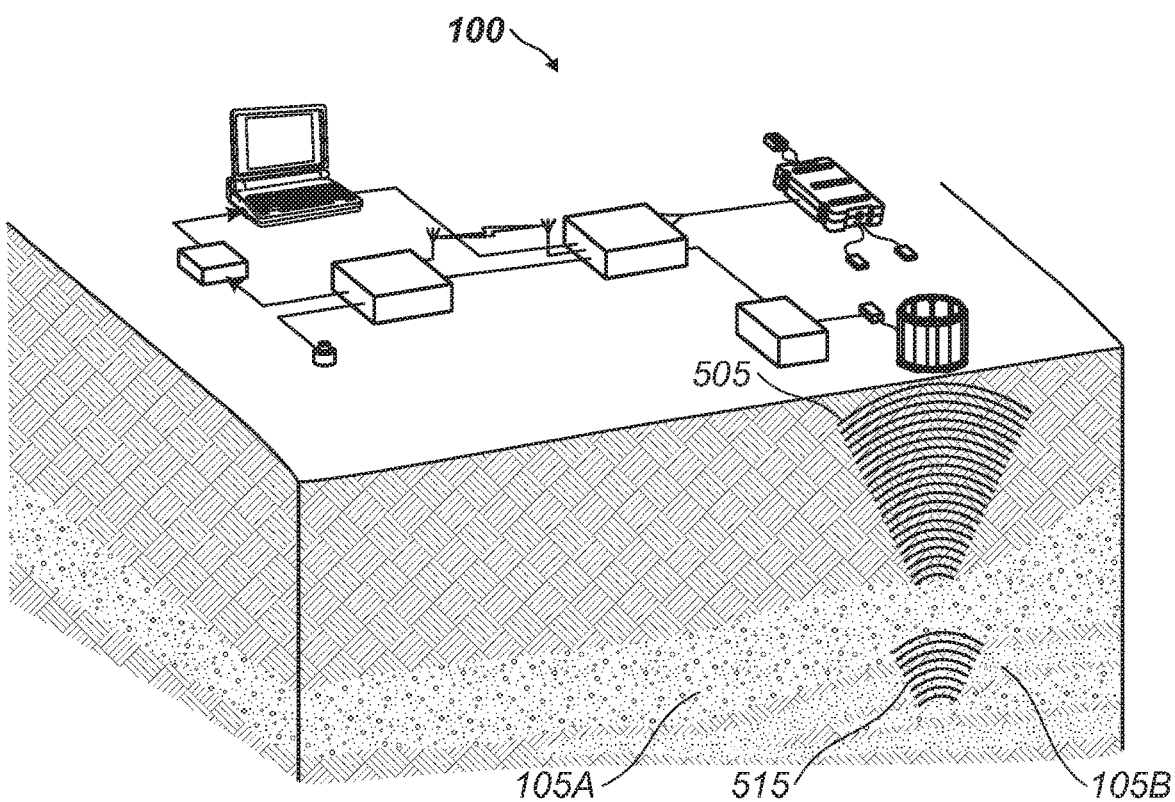
FIG. 7 illustrates an embodiment of a formation measuring system measuring multiple formations.

FIGS. 6 and 7 illustrate an embodiment of formation measuring system 100 conducting measurements for multiple subterranean formations 105. In embodiments, an electromagnetic pulse 500 may travel in a direction towards a first subterranean formation 105A. As electromagnetic pulse 500 interacts with first subterranean formation 105A, a portion of at least one low frequency wave and/or at least one high frequency wave may be reflected back to formation measuring system 100 as a first reflected electromagnetic wave 505. Depending on the composition of first subterranean formation 105A, the interaction between electromagnetic pulse 500 and first subterranean formation 105A may cause electromagnetic pulse 500 to partially reflect back into the direction of the surface elastically, reflecting frequencies in first reflected electromagnetic wave 505, which are also present in electromagnetic pulse 500. Without limitation, the elastic interactions may be dependent on the complex impedance distribution (i.e., discontinuities) of the composition. Said interaction between electromagnetic pulse 500 and first subterranean formation 105A may partly give rise to excited energy states, which may de-excite inelastically and re-transmit electromagnetic waves of at least one different frequency back towards the surface. This may produce a superimposition with first reflected electromagnetic wave 505 of the at least one low-frequency and/or high-frequency wave with a frequency also present in electromagnetic pulse 500. In other embodiments, this may produce a superimposition with first reflected electromagnetic wave 505 of the at least one high-frequency wave of at least one frequency not present in electromagnetic pulse 500. The remaining frequency waves within electromagnetic pulse 500, which were not reflected in subterranean formation 105A, may continue to travel towards a second subterranean formation 105B as a modified wave 510. Modified wave 510 may comprise of the components of electromagnetic pulse 500 not reflected in subterranean formation 105A and not otherwise attenuated, superimposed with down-ward traveling components of said at least one high-frequency wave of at least one frequency not present in electromagnetic pulse 500, which may be inelastically generated in subterranean formation 105A.

As modified wave 510 interacts with second subterranean formation 105B, a portion of at least one low frequency wave and/or at least one high frequency wave may be reflected back to formation measuring system 100 as a second reflected electromagnetic wave 515. Depending on the composition of second subterranean formation 105B, the interaction between modified wave 510 and second subterranean formation 105B may cause modified wave 510 to partially reflect back to the surface elastically, reflecting frequencies in second reflected electromagnetic wave 515, which may also be present in modified wave 510. Said interaction between modified wave 510 and second subterranean formation 105B may also partly give rise to excited energy states, which are similar or different from subterranean formation 105A, which may de-excite inelastically and re-transmit electromagnetic waves of at least one different frequency back towards the direction of the surface. This may produce a superimposition with second reflected electromagnetic wave 515 of the at least one low-frequency and/or high-frequency wave with a frequency also present in modified wave 510. In other embodiments, this may produce a superimposition with second reflected electromagnetic wave 515 of the at least one high-frequency wave of at least one frequency not present in modified wave 510. Second reflected electromagnetic wave 515 may superimpose onto first reflected electromagnetic wave 505, but may be delayed in time relative to first reflected electromagnetic wave 505. Hence, the deeper subterranean formation 105 may be buried, the longer the time delay. The functional dependence between time delay and burial depth may be called the time-depth conversion. The remaining frequency waves may continue to travel into the Earth until they either attenuate or interact in the same way as aforementioned with a plurality of subterranean formations 105.

Figure 8:
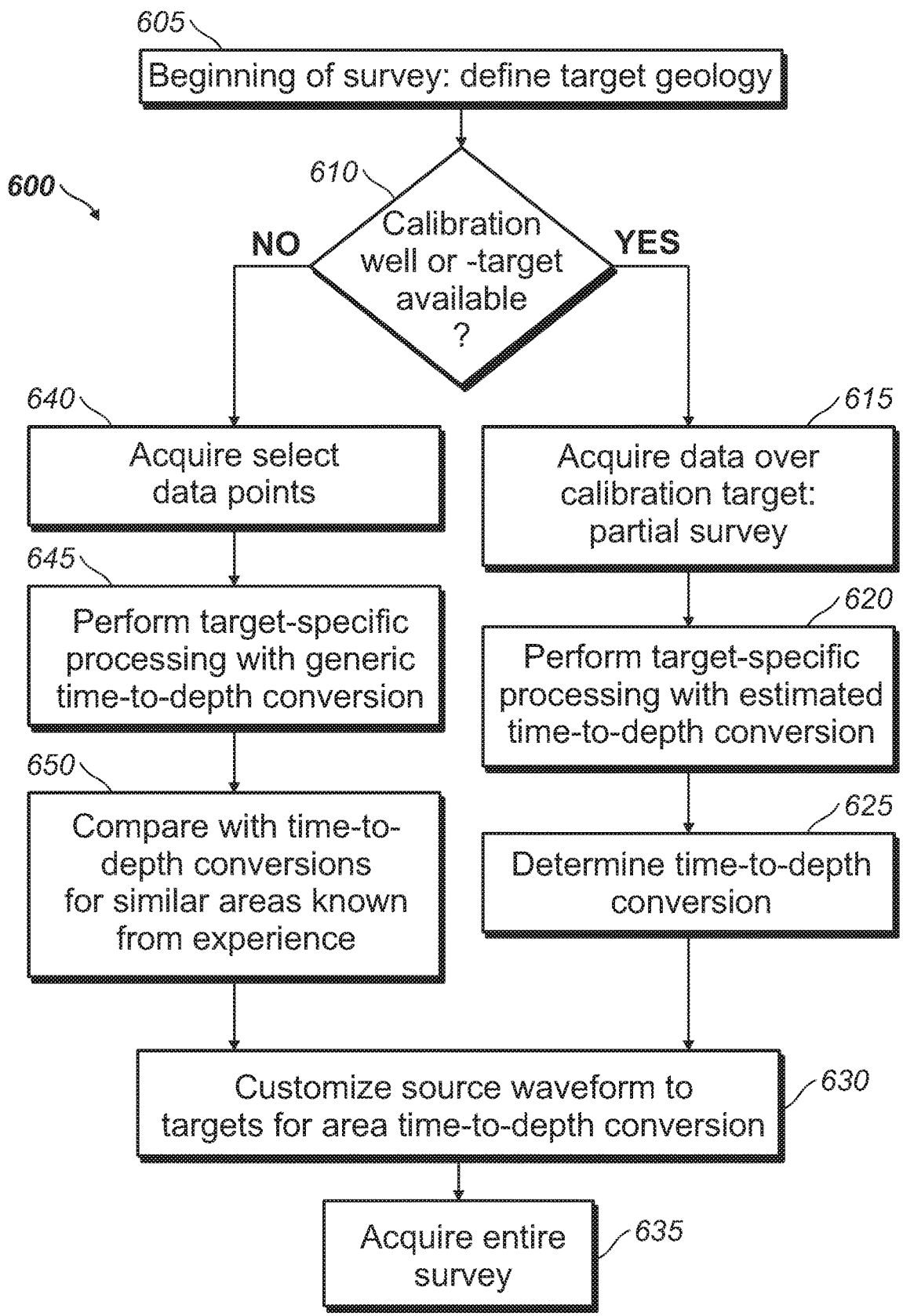
FIG. 8 illustrates a flowchart of an operating procedure for time-depth conversions.

FIG. 8 illustrates a flowchart 600 which may form an operating procedure for time-depth conversions. Each step in flowchart 600 may be performed by analysis unit 120 (referring to FIG. 1). Time depth conversions begin with step 605. Step 605 may comprise of defining a target geology. In embodiments, this may include geologic layers, including initial estimates of their depth or depths, and their lateral extent(s). In embodiments, an operator may input the characteristic receiver signature of the target geology to be measured. The characteristic receiver signature may be a specific reading pertaining to the targeted geology. In embodiments, an operator may select a processing workflow corresponding to the targeted geology. Without limitation, a suitable targeted geology may be oil, natural gas, water, air, mineral ore, rock, and/or combinations thereof.

Once targeted geology is defined, a logical decision may be made in step 610. Step 610 may split the flow of commands between two outcomes. For example, step 610 may comprise of deciding whether or not a calibration well is available. In embodiments, a calibration well may be any existing wellbore which formation measuring system 100 (referring to FIG. 1) may use to calibrate prior to measuring a designated area. If a calibration well is available, step 615 may be implemented.

Step 615 may comprise of conducting a partial survey. The partial survey may acquire data over an existing wellbore, if such exists, which has sufficient well logs or other information to determine the depths of at least one known calibration target. The at least one known calibration target may be the same kind, or a different kind, of target from the primary targeted geology of the survey defined in step 605. The wellbore may be located in the same area, or in a nearby area, or in any area known to be geologically similar to the present survey area.

After performing a partial survey in step 615, target-specific processing may be performed in step 620. Step 620 may comprise of using the appropriate processing workflow, or workflows (as discussed below), corresponding to said specific calibration target, or targets. The data acquired in the partial survey are processed with an a priori estimate of the time-to-depth conversion. The information collected in step 620 may be passed on to step 625.

Step 625 may comprise of determining the time-to-depth conversion. The results from step 620 may be aligned with those from step 625 by modifying the a priori estimate of the time-to-depth conversion until the depths of the calibration targets found in the processing aligns with the depths known from the wellbore information (such as well logs). The resulting time-to-depth conversion may be constant, approximately constant, and/or a varying function of depth. Step 620 and step 625 may be repeatedly aligned to find the time-to-depth conversion that fits with the wellbore information from step 605. In embodiments, iterative algorithms may be utilized for these processes.

The time-depth conversion found in step 625 may be fed into step 630. Step 630 may comprise of customizing the waveforms of transmitter 110 (referring to FIG. 1) to target geology for an area with the time-to-depth conversion found in step 625. The source waveform may depend on the depths of the target geology defined in step 605, with source waveforms targeting deeper target geology containing more low-frequency spectrum components, and shallower targets containing more high-frequency components. In case of stacked target geology at different depths, multiple source waveforms may be employed at the same time, or during separate source pulses. With the customized waveform or waveforms, step 635 may be implemented.

Step 635 may comprise of a conclusive step for flowchart 600. Step 635 may comprise of acquiring an entire survey for a designated area. In embodiments, a source waveform may be used that is expected to target the depths of each target geology located underneath a specific shot point. Over a survey area with a plurality of shot points, the plurality of shot points may have varying source waveforms according to where the target geology may be expected to be located. In other embodiments, the source waveform may be adjusted during the survey in order to resolve quality.

Referring back to step 610, if a calibration well is not available, step 640 may be implemented. Step 640 may comprise of acquiring selected data points. The data acquired at the selected data points may be compared to refine the acquisition parameters of the survey from step 605. Information from step 640 may be passed to step 645.

Step 645 may comprise of processing the data from step 640 for the designated area. Using the appropriate processing workflow, or workflows (as discussed below), corresponding to all desired targets defined in step 605, the data acquired in the partial survey of step 640 may be processed with an a priori estimate of the time-to-depth conversion. After processing the data, step 650 may be implemented.

Step 650 may comprise of comparing the results from step 640 and step 645. Step 640 and step 645 may be aligned by modifying the a priori estimate of the time-to-depth conversion until the depths of the calibration targets found in the processing aligns with the depths of similar calibration targets in a database of prior surveys. The resulting time-to-depth conversion may be constant, approximately constant, and/or a varying function of depth. Step 640 and step 645 may be repeatedly aligned to find the time-to-depth conversion. Step 650 may then implement step 630 and subsequently step 635 to end flowchart 600. The resultant product of flow chart 600 may be at least one depth profile of an exploration target, such as oil, gas, water, and/or combinations thereof.

Figure 9:
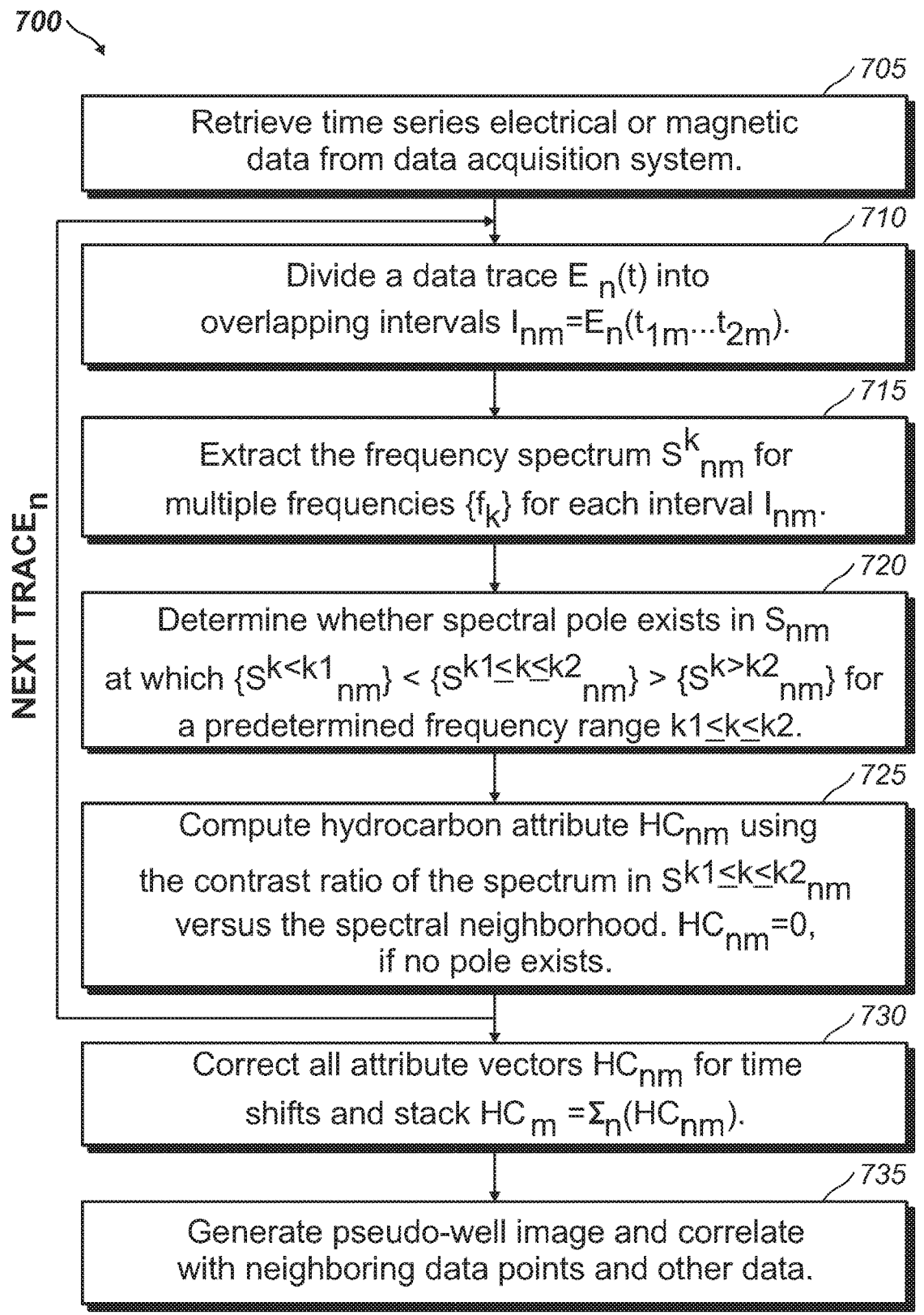
FIG. 9 illustrates a flowchart of an operating procedure to process hydrocarbon measurements.

FIG. 9 illustrates a flowchart 700 which may form an operating procedure to process hydrocarbon measurements. Flowchart 700 may be used to conduct measurements for single and/or multiple, stacked subterranean formations 105 (referring to FIGS. 6 and 7). Each step in flowchart 700 may be performed by analysis unit 120 (referring to FIG. 1). Analysis unit 120 may be configured to extract a time domain pattern with a pattern filter. In embodiments, the pattern filter may be found in a lab, empirical field tests, observed data, and/or combinations thereof. In embodiments, stacked subterranean formations 105 comprise at least two formations, wherein at least a portion of a first formation 105A at a first depth vertically aligns with at least a portion of a second formation 105B at a second depth below the first formation. Flowchart 700 may be used for processing measurements associated with hydrocarbons. The first step for flowchart 700 may begin with step 705. Step 705 may comprise of retrieving a time series of electrical and/or magnetic data from data acquisition system 410 (referring to FIG. 4). Both the electrical and/or magnetic data will be symbolized by $E_n(t)$ for an equation in step 710, wherein n may be an index which counts the number of traces acquired using the same source waveform.

Step 710 may comprise of dividing a data trace into overlapping intervals $I_{nm}$, wherein m may be an index counting the interval extracted from m=1 (first interval near the surface), and wherein each interval is identified by the equation below:

$$I_{nm} = E_n(t1_m - t2_m) \quad (1)$$

Equation 1 may contain all data from the time $t1m$ to $t2m$, wherein $t1_m < t1_{m+1} < t2_m$ and $t2_m < t2_{m+1} < t1_{m+2}$ for all m.

Information from step 710 may be put into step 715. Step 715 may comprise of extracting the frequency spectrum $S^k_{nm}$ for multiple frequencies symbolized by the index k for each interval m of step 710 for each trace n of the step 705. The spectrum may be obtained by a numerical representation of the Fourier transform, such as Fast Fourier Transform or Discrete Fourier transform, or of any other means extracting the presence of a certain frequency in a time-domain data trace, such as the Goertzel transform. The spectrum may be utilized in step 720.

Step 720 may comprise of determining whether a spectral pole exists in at least one frequency k in the frequency spectrum $S^k_{nm}$. In embodiments, said pole may be greater than the neighboring frequencies, may be at least greater by a certain factor compared to the neighboring frequencies, and/or may be at least greater by a certain interval compared to the neighboring frequencies. Only frequencies k within a certain predetermined frequency range may be chosen, $k1 \leq k \leq k2$. The frequency range may be a known value range for specific targets such as hydrocarbons, and said frequency range may be narrowed by noise.

Information from step 720 may be fed to step 725. Step 725 may comprise of computing a hydrocarbon attribute $HC_{nm}$ for a depth of interval m of trace n by using the contrast ratio of the pole in the spectrum $S_{nm}$, as previously, versus the spectral neighborhood. If no pole exists, $HC_{nm} = 0$. In embodiments, step 710 to step 725 may repeat for every trace. In embodiments, a trace may be a single shot with a given source waveform, as described in step 705. Once the hydrocarbon attribute has been computed for the last trace, step 730 may be implemented.

Step 730 may comprise of correcting all attribute vectors for time shifts and subsequently stacking the traces, wherein traces may be weighted corresponding to their accompanying acquisition noise. This information may be finalized in step 735.

Step 735 may comprise of generating a pseudo-well image. In embodiments, step 735 may generate the pseudo-well image by correlating with neighboring data points and other data. The pseudo-well image may be used to visually show where multiple subterranean formations 105 (referring to FIGS. 6 and 7) may be located. Using the pseudo-well image may reduce time and money spent on exploration and drilling operations.

Figure 10:
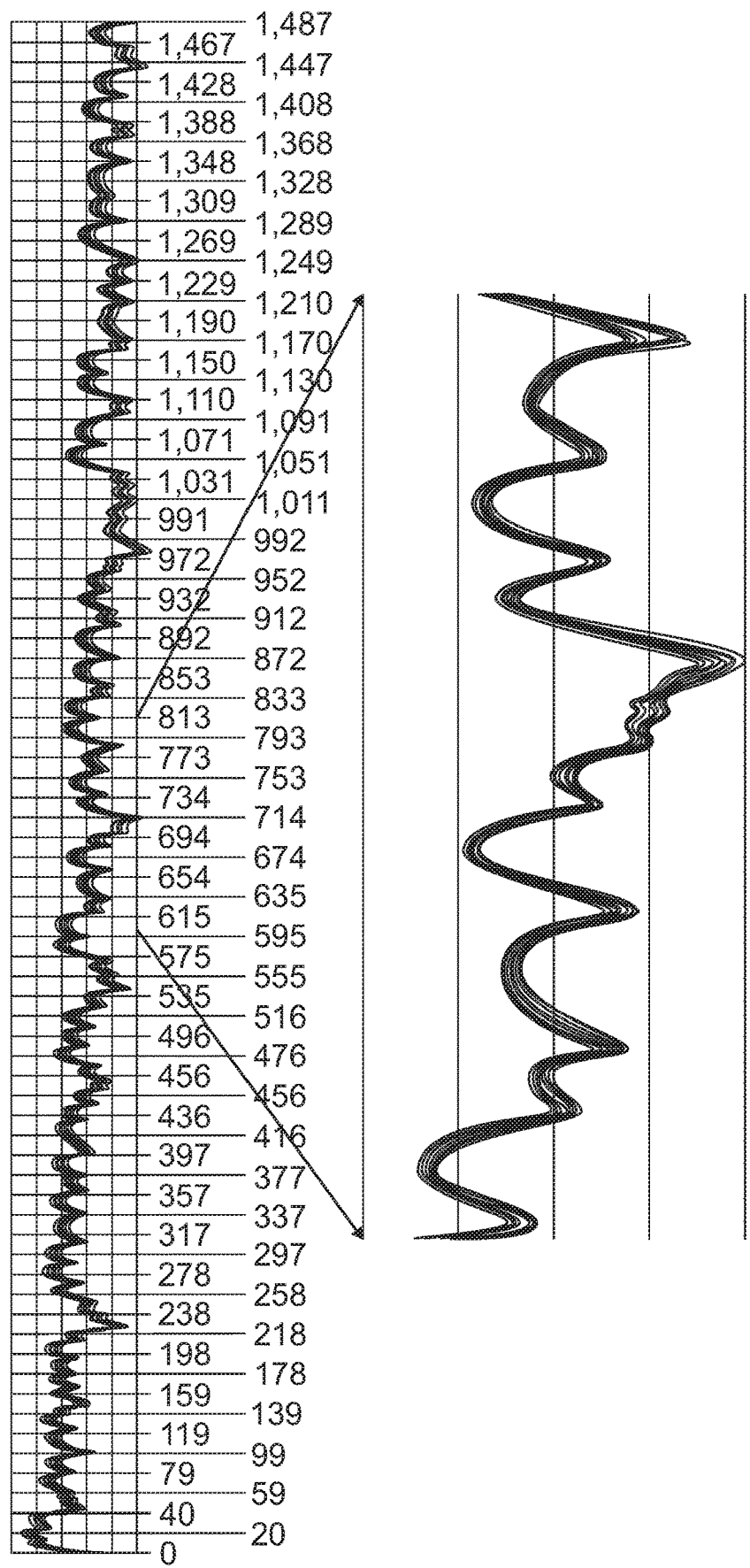
FIG. 10 illustrates a graph of signal strength versus depth of investigation.

FIG. 10 illustrates a graph of signal strength versus depth of investigation highlighting a hydrocarbon anomaly. A hydrocarbon anomaly may be a formation containing hydrocarbons (e.g., oil and gas) represented by variance between multiple traces on the graph. As illustrated, a hydrocarbon anomaly may be visible in the electromagnetic raw data, wherein multiple example traces are shown. The hydrocarbon anomaly may correspond to visible frequency modulations at a known frequency range (higher than the background shown), which may not be otherwise present. Flowchart 700 (referring to FIG. 9) may be implemented when the hydrocarbon anomalies are not visible in the raw data, as needed. When a hydrocarbon anomaly is visible in the raw data of a graph of signal strength versus depth of investigation, this representation may be used to visually show where subterranean formations 105 (referring to FIGS. 6 and 7) may be located. As discussed above with the pseudo-well image of FIG. 10, the hydrocarbon anomaly representation may reduce time and money spent on exploration and drilling operations.

FIG. 11 illustrates a graph depicting a hydrocarbon spectral attribute. The graph may be produced from flowchart 700 and displayed for review by the operator. A hydrocarbon spectral attribute may signify the presence of oil and/or gas deposits within a subterranean formation. In embodiments, the size of the peaks may be a gauge of the formation saturation with oil and/or gas, as well as the formation thickness. Stacked peaks may indicate stacked reservoirs. As is common in electromagnetic methods, the depths of the formation found may be accurate to within about 10%.

FIG. 12A illustrates an embodiment of formation measuring system 100. In embodiments, formation measuring system 100 may comprise a remote collection station 1005. Formation measuring system 100 may expand the surveying area by employing remote collection station 1005. Remote collection station 1005 may collect data from the reflected electromagnetic waves at a distance away from transmitter 110. FIG. 12B illustrates an embodiment of remote collection station 1005. In embodiments, the distance between remote collection station 1005 and transmitter 110 may be larger than the distance between receiver 115 and transmitter 110. Without limitation, remote collection station 1005 may be up to 2,000 meters away from transmitter 110. There may be a plurality of remote collection stations 1005. The plurality of remote collection stations 1005 may be disposed in any configuration around transmitter 110. The data collected from the plurality of remote collection stations 1005 may be able to produce a 3D tomography survey. The plurality of remote collection stations 1005 may collect data from both the horizontal plain and from a vertical depth. In embodiments, remote collection station 1005 may comprise of receiver 115, a second controller and data acquisition unit 1020, a satellite navigation unit 1015, and a communication unit 1010.

Second controller and data acquisition unit 1020 may serve to provide power to remote collection station 1005. Without limitation, second controller and data acquisition unit 1020 may utilize any hardware or software to control the operation of remote collection station 1005. Additionally, second controller and data acquisition unit 1020 may contain a digitizer to convert received electromagnetic waves into signals, or alternatively, the raw analog signals may be transmitted to the data acquisition unit 410 (referring to FIG. 4). In embodiments, second controller and data acquisition unit 1020 may be disposed about receiver 115.

Satellite navigation unit 1015 may provide the location of remote collection station 1005. Satellite navigation unit 1015 may be any device capable of receiving information from a satellite. Satellite navigation unit 1015 may calculate the location of remote collection station 1005 relative to the satellite. In embodiments, satellite navigation unit 1015 may administer ground-based localization protocols to calculate the location of remote collection system 1005 relative to the ground. Satellite navigation unit 1015 may be disposed anywhere within remote collection station 1005. In embodiments, satellite navigation unit 1015 may be disposed about a surface of receiver 115. Alternatively, satellite navigation unit 1015 may include software contained within second controller and data acquisition unit 1020 to synchronize data collection with master transmission.

Communication unit 1010 may provide the ability to communicate between remote collection station 1005 and data acquisition system 410 (referring to FIGS. 4 and 5). Communication unit 1010 may be any suitable hardware and/or software. In embodiments, communication unit 1010 may provide the ability to communicate over a wireless link. Communication unit 1010 may also provide the ability to communicate between a plurality of remote collection stations 1005. Communication unit 1010 may be disposed anywhere within remote collection station 1005. In embodiments, Communication unit 1010 may be disposed about a surface of receiver 115. Alternatively, communication unit 1010 and satellite navigation unit 1015 may be software contained within second controller and data acquisition unit 1020 to synchronize data collection with master transmission.

Figure 13:
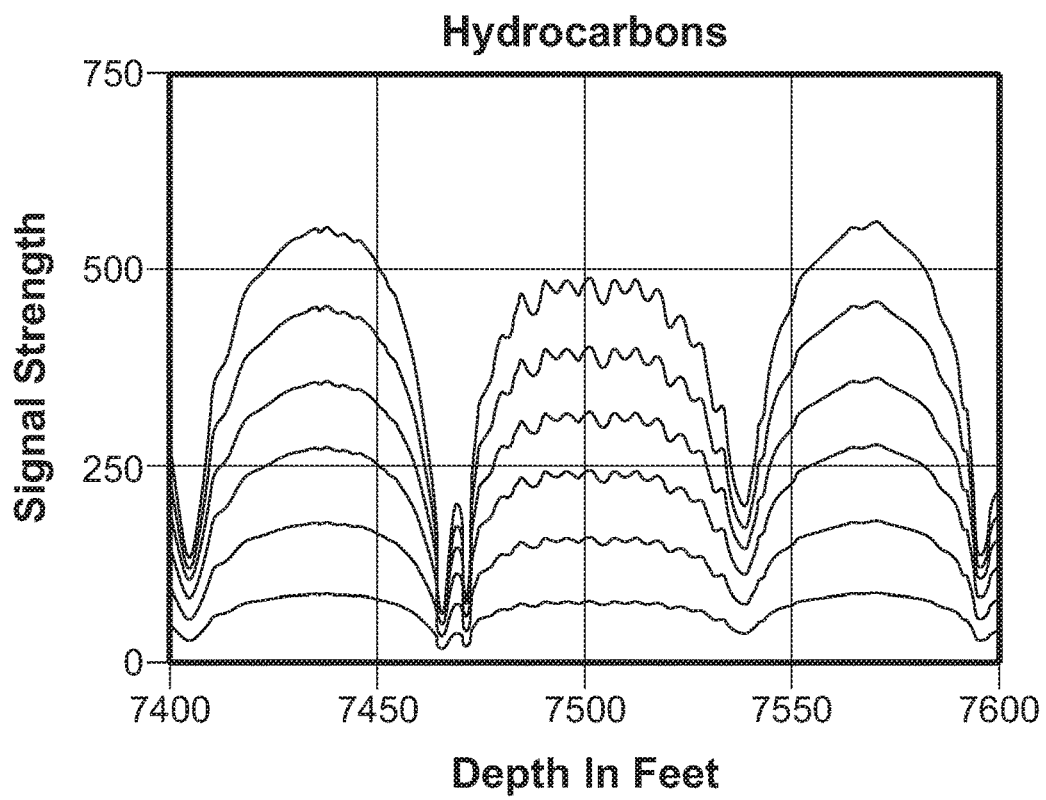
FIG. 13 illustrates a graph of signal strength versus depth of investigation.

FIG. 13 illustrates a graph of signal strength versus depth of investigation. In embodiments, the characteristic signature of hydrocarbons may be illustrated by fluctuations in the signal strengths of multiple repeated traces acquired over a certain range of depth of investigation. Data acquired that show signal strength fluctuating in depth over multiple electromagnetic pulses may produce a numerical value for the depth of investigation. In embodiments, an operator may visually observe that there are hydrocarbons present at 7,500 feet below the Earth's surface.

Figure 14:
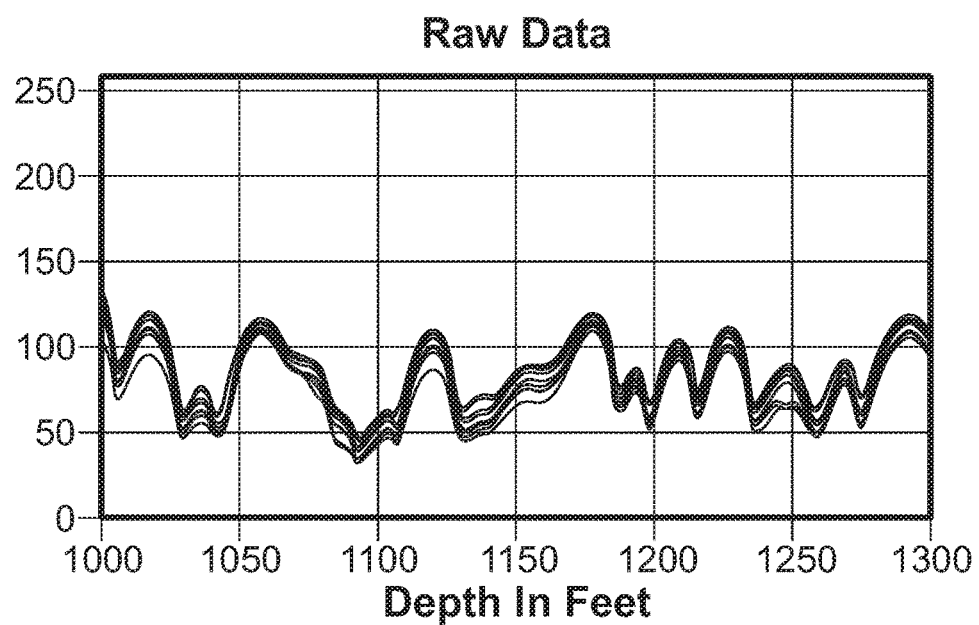
FIG. 14 illustrates a graph of signal strength versus depth of investigation.
Figure 15:
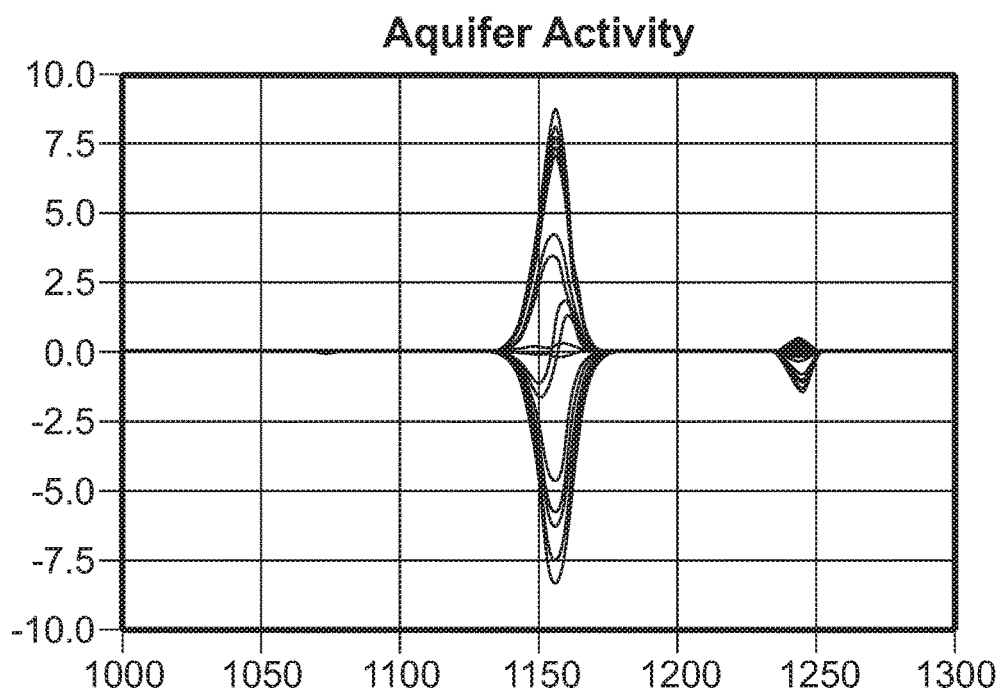
FIG. 15 illustrates a graph of data processing for aquifer splitting.

FIG. 14 illustrates a graph of signal strength versus depth of investigation. In embodiments, raw data may be produced for the characteristic signature of water. As illustrated, there are large fluctuations around a depth of 1,155 feet and smaller fluctuations around 1,250 feet. These characteristic signatures may provide the locations of proportional sizes of neighboring subterranean formations 105 (referring to FIG. 1) containing water. FIG. 15 illustrates further data processing for aquifer splitting. The incident electromagnetic wave due to each pulse, or trace, may result in an excitation of the different layers within an aquifer. This excitation in turn may affect the interaction between the subsequent pulses with the excited aquifers. Aquifer splitting may be the reflection of part of the pulse back to the surface during de-excitation. The enhanced conductivity associated with an aquifer with greater salinity may lead to faster dissipation of the excitation, which may affect the reflected part of the pulse back to the surface. This effect may be quantified with the development of a database of verified surveys.

Figure 16:
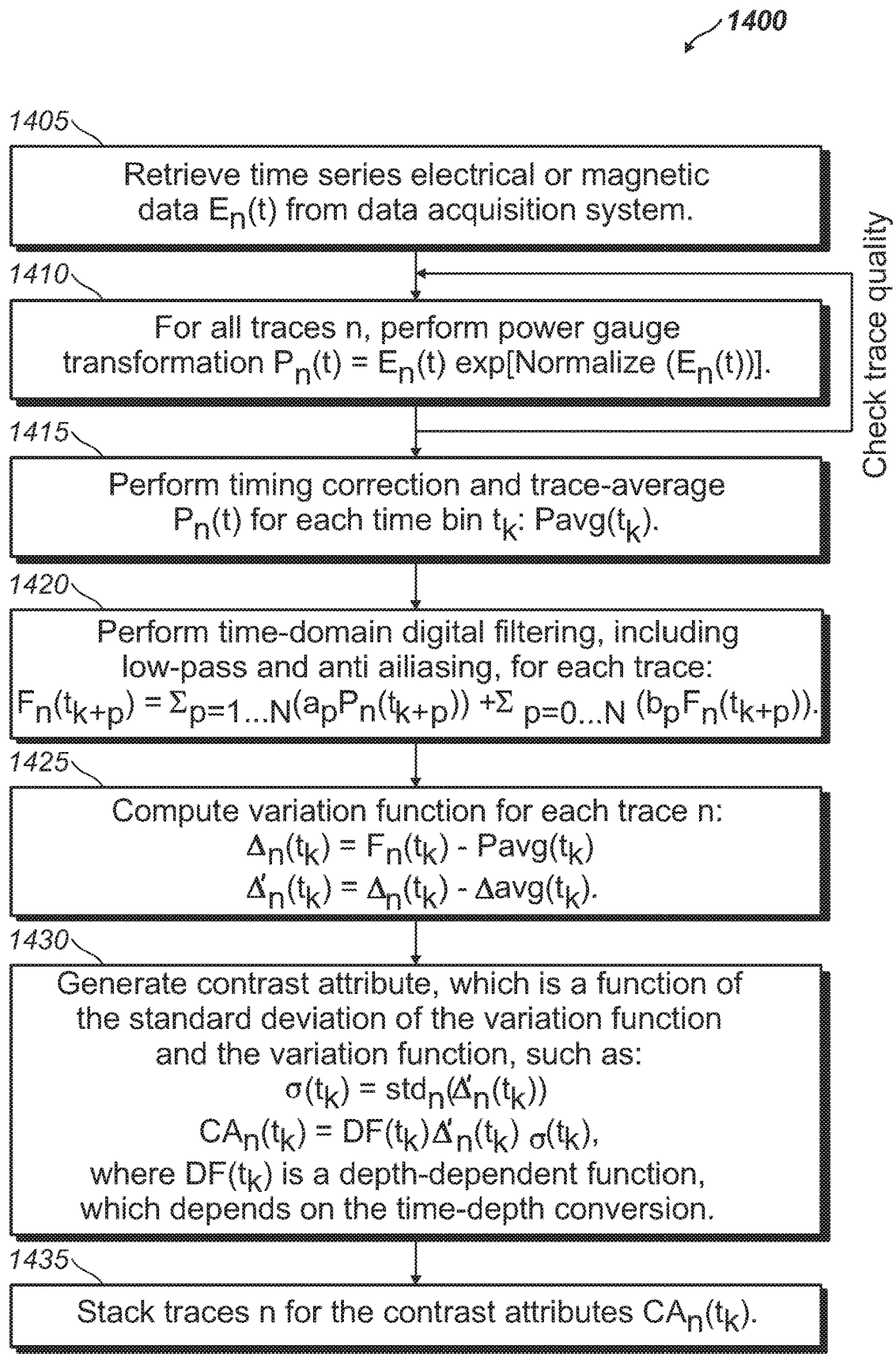
FIG. 16 illustrates a flowchart for processing data associated with water.
Figure 18A:
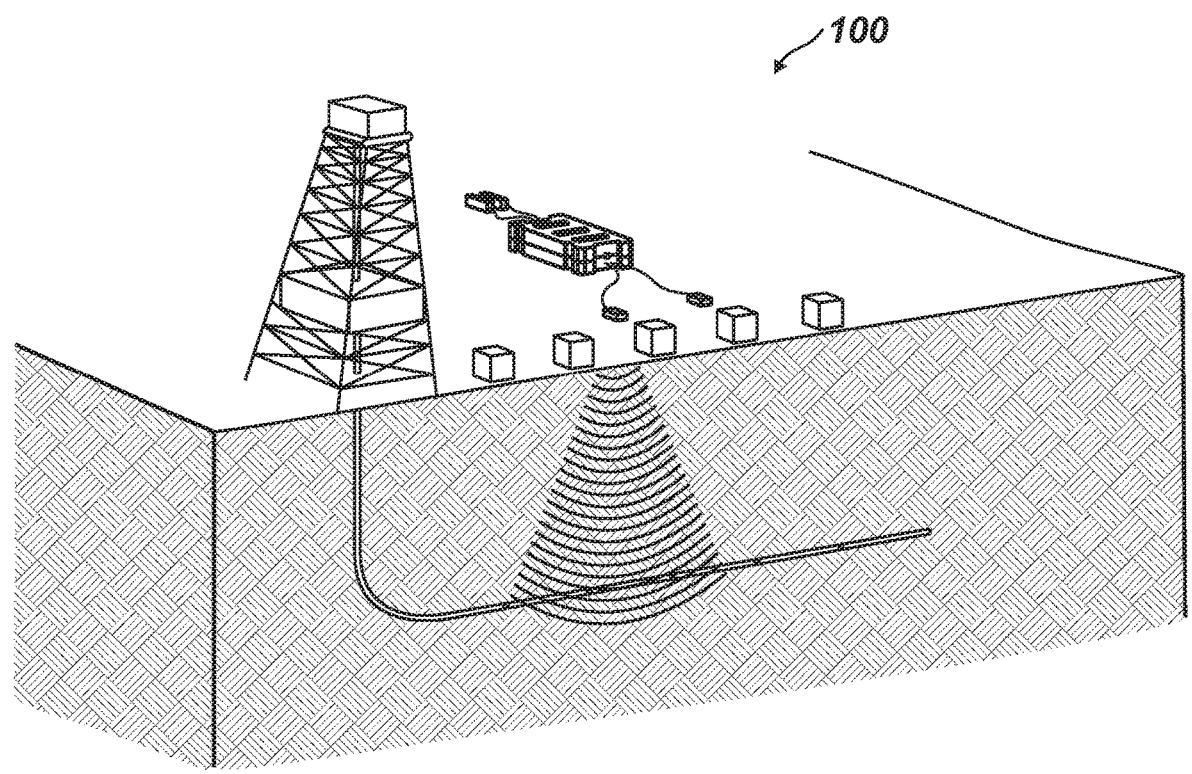
FIGS. 18A-18D illustrate an embodiment of a formation measuring system in use for hydraulic fracturing.
Figure 18B:
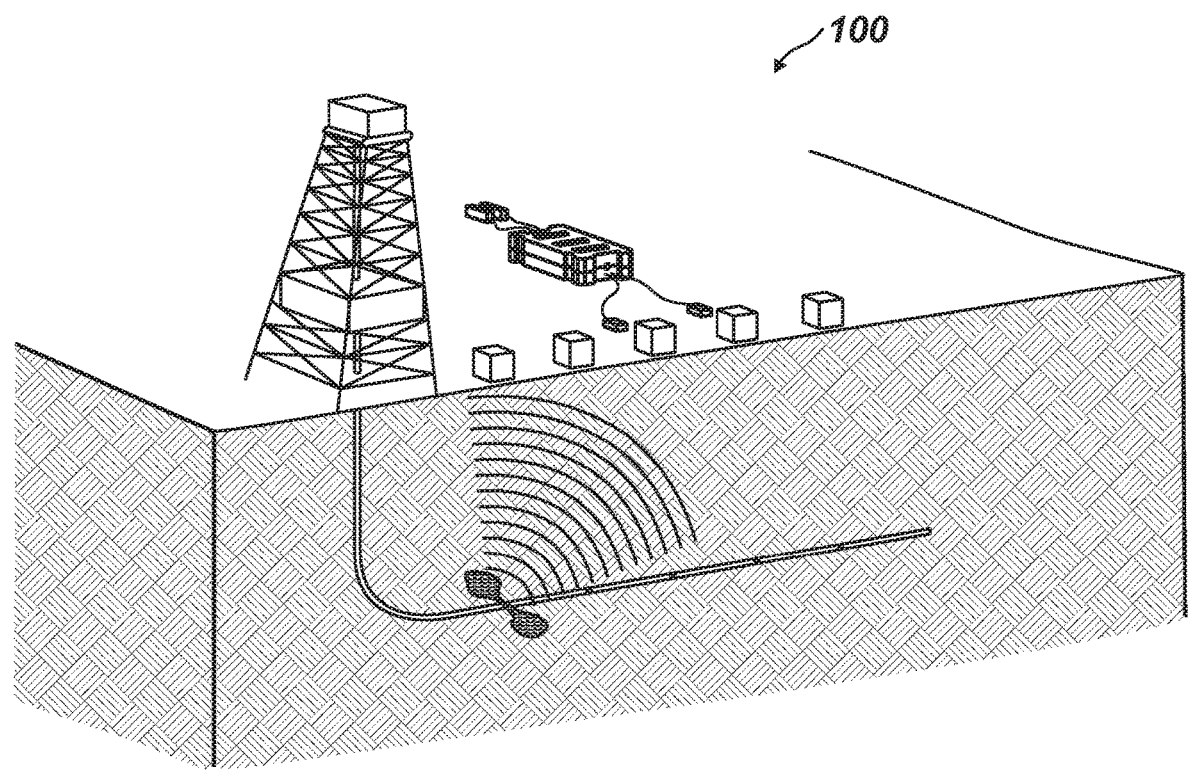
Figure 18C:
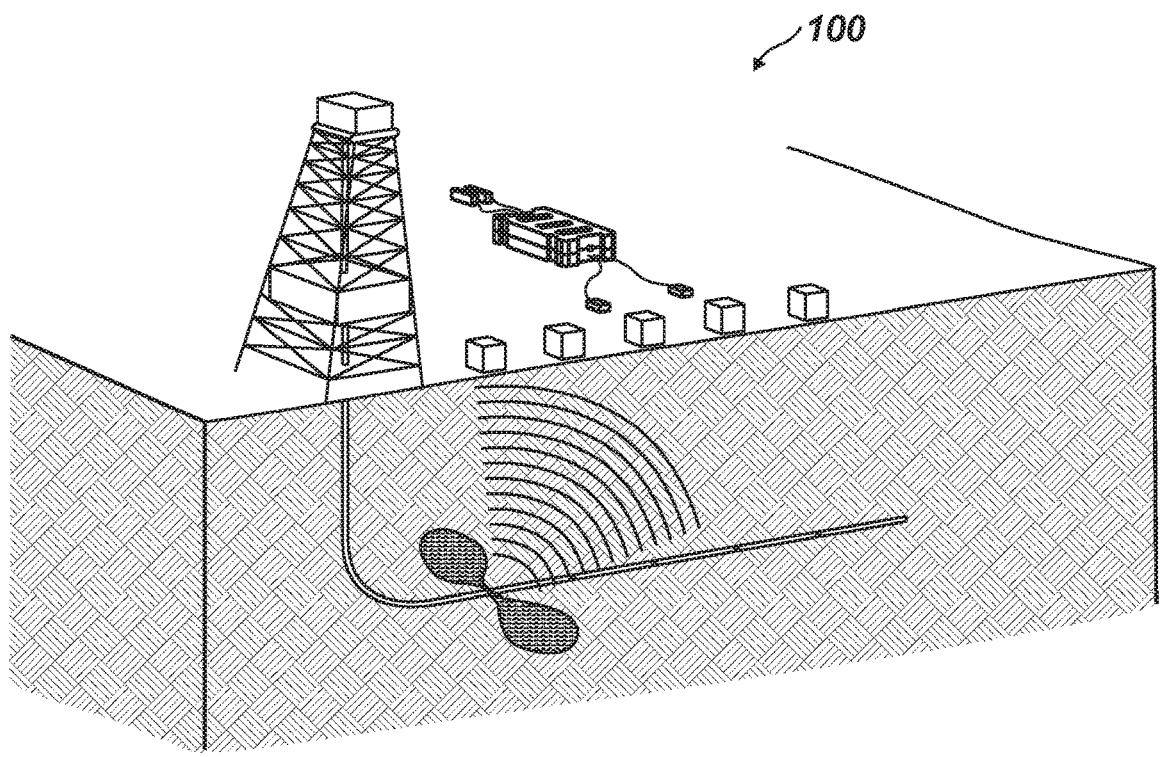
Figure 18D:
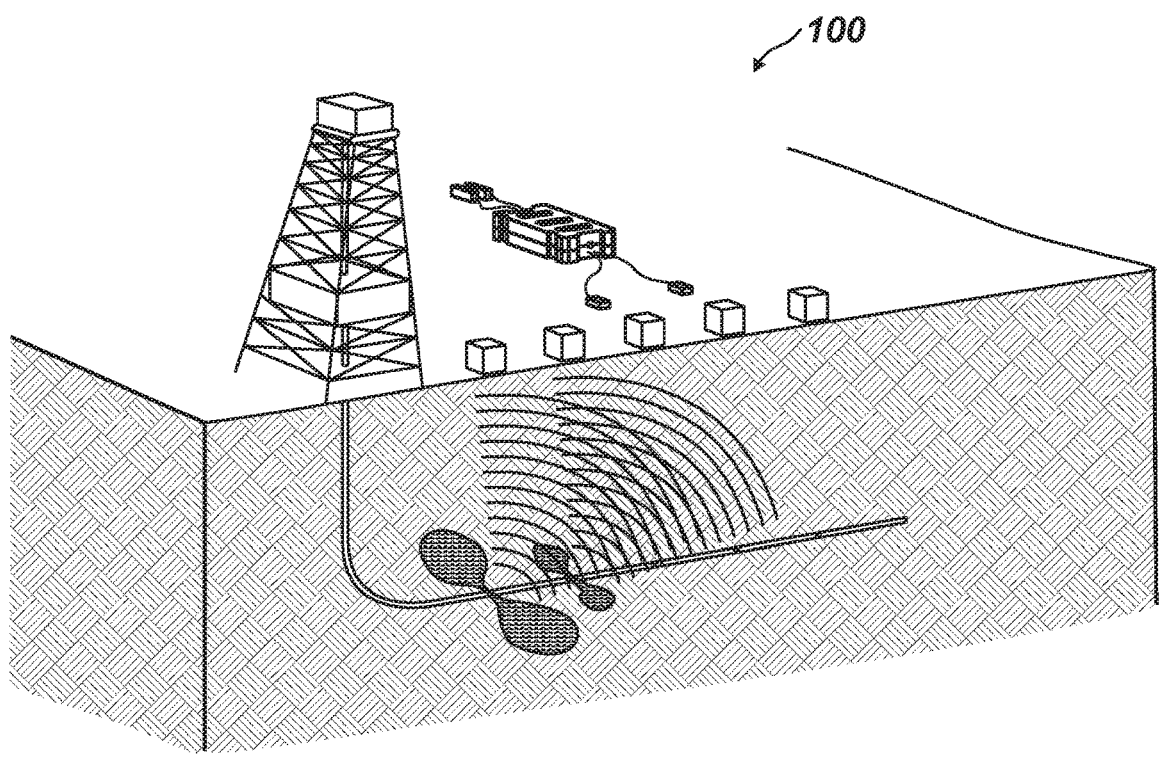

FIG. 16 illustrates an embodiment of a flowchart 1400. Flowchart 1400 may be used for processing data associated with subterranean formations 105 (referring to FIG. 1) comprising water. Each step in flowchart 1400 may be performed by analysis unit 120 (referring to FIG. 1). The first step for flowchart 1400 may be step 1405. Step 1405 may comprise of retrieving a time series of electrical and/or magnetic data from data acquisition system 410 (referring to FIG. 4). Both the electrical and/or magnetic data may be symbolized by $E_n(t)$, wherein n is an index which counts the number of traces acquired using the same source waveform. Information for the traces may be passed to step 1410.

Step 1410 may comprise of performing a power gauge transformation for all traces. That is, for all times t, the electromagnetic field may get resealed as identified below:

$$P_n(t) = E_n(t) \exp(A^* E_n(t)) \tag{2}$$

In Equation 2, A may be an empirical renormalization constant. In embodiments, the power gauge transformation for each trace may be checked for quality. After a check for quality, information may be passed to step 1415.

Step 1415 may comprise of performing a timing correction and trace-average for each time bin. The objective may be to stack all good-quality traces as determined in step 1410 and average them for each time bin k. In order to avoid distortions, some traces may need to be time-shifted to ensure that the time-axis starts with the beginning of the source pulse (i.e., they have the same time coordinate system).

Step 1420 may comprise of performing a time-domain digital filtering of all good-quality traces $P_n(t)$ as obtained in step 1410. In embodiments, the digital filtering may comprise low-pass filters and/or anti-aliasing, and/or any band-pass filter for frequency bands which are especially sensitive to water signatures, and/or band reject filters which may eliminate noisy frequency bands for each trace identified below:

$$F_n(t_k) = \Sigma_{p=1 \ldots N}(a_p P_n(t_{k+p})) + \Sigma_{p=0 \ldots N}(b_p F_n(t_{k+p})) \tag{3}$$

The filters may be described by N+1 coefficients $a_p$ and N coefficients $b_p$, wherein N may be the order of the filter. The filter may be finite-impulse response, for the special case of all coefficients $b_p = 0$, or otherwise infinite-impulse response. The filtered information may pass to step 1425.

Step 1425 may comprise of computing a variation function for each trace, based on the trace-average $Pavg(t_k)$, obtained in third step 1415, and the filtered traces $F_n(t_k)$ obtained in step 1420. The variation function may be obtained in two steps, wherein a first function A is computed for each trace and each time bin by the equation below:

$$\Delta_n(t_k) = F_n(t_k) - Pavg(t_k) \tag{4}$$

Wherein a second function is computed for each trace and each time bin, based on said first function $\Delta_n(t_k)$ and its time-average $\Delta avg(t_k)$, following the equation below:

$$\Delta'_n(t_k) = \Delta_n(t_k) - \Delta avg(t_k) \tag{5}$$

The variation function may be passed to step 1430. Step 1430 may comprise of generating a contrast attribute. In embodiments, a contrast attribute may be the standard deviation across all traces n of the variation function in Equation 5. In some embodiments, the resulting standard deviation $\sigma(t_k)$ may be scaled by the variation function in Equation 5, as well as by an empirical depth-dependent scaling function. The scaling function may be depth-dependent, and may be translated to a time-dependent function $DF(t_k)$ using a time-depth conversion illustrated below:

$$CA_n(t_k) = DF(t_k) \Delta'_n(t_k) \sigma(t_k) \tag{6}$$

The contrast attribute may be fed to step 1435. Step 1435 may comprise of a conclusive step for flowchart 1400. Step

1435 may comprise of stacking (i.e., adding or averaging) the traces of the contrast attributes $CA_n(t_k)$ to generate a visual display for an operator.

Figure 17:
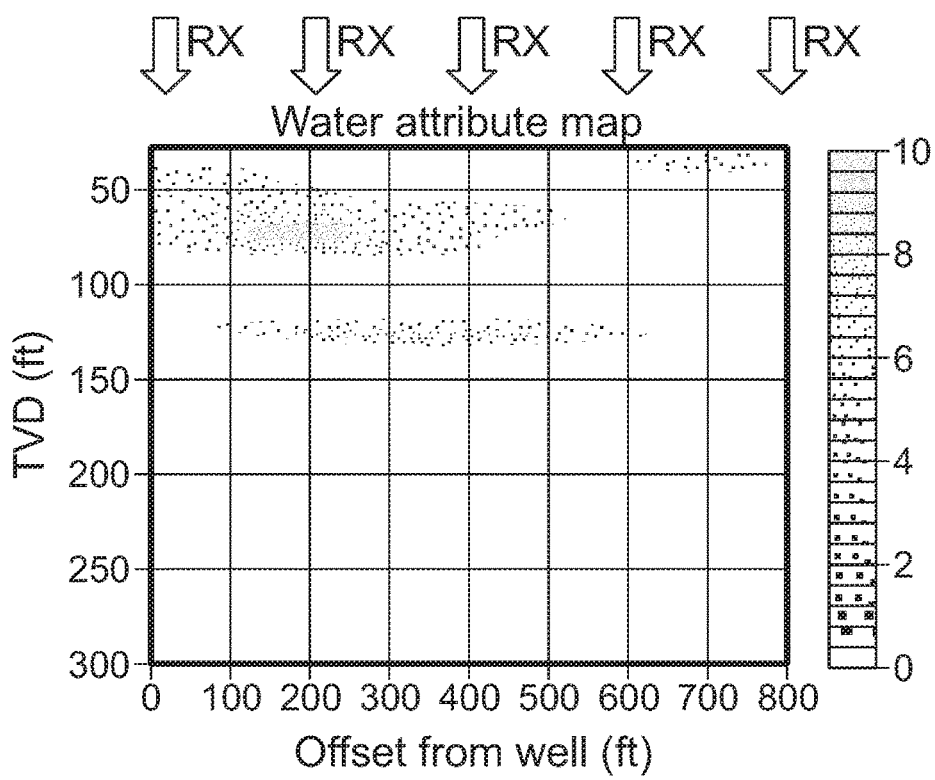
FIG. 17 illustrates a visual representation of a water formation.

FIG. 17 illustrates a visual representation of a water formation found at a true vertical depth (TVD) versus a distance from the known producing and/or calibration well (offset from well). In embodiments, the visual representation may be a water attribute map. The water attribute map may comprise of the contrast attributes calculated in flowchart 1400 (referring to FIG. 16). In embodiments, there may be a scale relating the number of contrast attributes to the physical presence of water. As the numeric value of the contrast attributes for a specific location increase, the density for a quantity of water may increase. This may be used to identify a suitable drilling location for the next water well.

FIGS. 18A through 18D illustrate an embodiment of formation measuring system 100 in use for hydraulic fracking. Hydraulic fracturing ("fracking") may be the process of injecting a fluid into a production well, wherein the production well has openings to allow the fluid to come into contact with the shale rock and shatter said rock to enable hydrocarbons to flow to the production well. One of the drawbacks of "fracking" is a requirement of using large amounts of water in the fluid. Through its "quick-look," real-time capabilities, formation measuring system 100 may be able to better monitor how much water needs to be injected into which parts of a reservoir, thereby reducing the water usage through more-efficient monitoring. Monitoring may be performed by utilizing the method described in flowchart 1400. From the surface, it may not be apparent to determine how much of the targeted volume of shale rock has interacted with the injected fluid.

In embodiments, formation measuring system 100 may be employed to take repeated measurements to observe the progression of the injected fluid. For example, recording a first location of the fluid in subterranean formation, transmitting the electromagnetic pulse into the subterranean formation from the transmitter a second time, receiving a reflected electromagnetic wave from the subterranean formation with the plurality of remote collection stations a second time, recording the second location of the fluid in the subterranean formation, and determining movement of the fluid from the difference between the first location and the second location.

Formation measuring system 100 may generate a visual representation of the progression of the injected fluid into the production well and subsequently into the shale rock. Operation of formation measuring system 100 may allow for an increase and/or decrease in the injected fluid's flow rate to acquire the desired output.

In an exemplary aspect, the present disclosure is directed to a method for detecting formation properties comprising: disposing a transmitter at a surface; disposing a receiver at the surface; coupling a high frequency wave to a low frequency wave to form an electromagnetic pulse; transmitting the electromagnetic pulse into a formation from the transmitter; receiving a reflected electromagnetic wave from the formation with the receiver; and determining the depth and nature of the formation from the surface.

In another exemplary aspect, the present disclosure is directed to a method wherein the reflected electromagnetic wave is a retransmission of the electromagnetic wave at frequencies different from the frequencies contained in the incident electromagnetic wave.

In another exemplary aspect, the present disclosure is directed to a method, wherein the reflected wave is formed through inelastic scattering of the incident wave that is specific to the formation.

In another exemplary aspect, the present disclosure is directed to a method, wherein the reflected wave is formed through the coupling between the incident electromagnetic wave and geology such that acoustic vibrational energy is created within the formation which in turn generates a secondary electromagnetic wave which may return to the surface containing frequencies different to those of the incident wave.

In another exemplary aspect, the present disclosure is directed to a method, further comprising identifying a composition of the formation from the amplitudes of multiple frequencies contained within the reflected electromagnetic wave.

In another exemplary aspect, the present disclosure is directed to a method, wherein the reflected electromagnetic wave is formed from discontinuities in complex resistivity or permittivity.

In another exemplary aspect, the present disclosure is directed to a method, further comprising analyzing the reflected electromagnetic wave in a time-domain reflectometry mode.

In another exemplary aspect, the present disclosure is directed to a method, further comprising determining the formation properties from the time-domain reflectometry mode.

In another exemplary aspect, the present disclosure is directed to a method, further comprising shaping the electromagnetic pulse.

In another exemplary aspect, the present disclosure is directed to a method, wherein shaping the electromagnetic pulse depends on the depth of formation and the formation properties.

In another exemplary aspect, the present disclosure is directed to a method for monitoring an injection of a fluid into a formation comprising: disposing a plurality of remote collection stations on a surface; disposing a transmitter on the surface; coupling a high frequency wave to a low frequency wave to form an electromagnetic pulse; transmitting the electromagnetic pulse into the formation from the transmitter; receiving a reflected electromagnetic wave from the formation with the plurality of remote collection stations; recording a first location of the fluid in the formation; transmitting the electromagnetic pulse into the formation from the transmitter a second time; receiving a reflected electromagnetic wave from the formation with the plurality of remote collection stations a second time; recording the second location of the fluid in the formation; determining movement of the fluid from the first location and the second location.

In another exemplary aspect, the present disclosure is directed to a method, further comprising displaying the movement of the fluid from the first location and the second location in near real time on an analysis unit.

In another exemplary aspect, the present disclosure is directed to a formation measuring system comprising: a transmitter, wherein the transmitter is configured to couple a high frequency wave to a low frequency wave to faint an electromagnetic pulse; at least one receiver; a data acquisition system; and an analysis unit, wherein the analysis unit is configured to determine the movement of a fluid in a formation and display the movement of the fluid in the formation in near real time.

In another exemplary aspect, the present disclosure is directed to a system, wherein the receiver is a loop or a coil.

In another exemplary aspect, the present disclosure is directed to a system, further comprising a digitizer, wherein the digitizer is disposed in the data acquisition system and enables discretization and quantization of recorded data from the receiver.

In another exemplary aspect, the present disclosure is directed to a system, further comprising a communication unit that is attached to at least one receiver.

In another exemplary aspect, the present disclosure is directed to a method to detect properties of the subsurface which utilizes an electric or magnetic carrier signal with a relatively slower time variation, which is modulated by an investigative signal having relatively faster time variation. The relatively slower varying carrier signal serves to carry energy to deeper regions in the subsurface, thereby extending the depth of investigation of the investigative signal. The investigative signal having the relatively faster time variations are analyzed in a time-domain reflectometry mode to deduce the properties of the subsurface. The time-domain analysis permits the detection of high-frequency variations which would otherwise be attenuated.

In another exemplary aspect, the present disclosure is directed to a method to detect properties of the subsurface which utilizes the conversion of primary electromagnetic waves or pulses in the subsurface into vibrational energy through electro-vibrational coupling, and back into secondary electromagnetic pulses or waves through vibrational-electric coupling. The secondary electromagnetic pulses or waves are detected and analyzed to obtain information about the subsurface through its coupling strength.

In another exemplary aspect, the present disclosure is directed to a method to detect properties of the subsurface which utilizes the reflection of electromagnetic wave forms or pulses from discontinuities in complex impedance, which might include resistivity, permittivity or any combinations thereof. The secondary electromagnetic pulses or waves are detected and analyzed to obtain information about the discontinuities in complex subsurface impedance.

In another exemplary aspect, the present disclosure is directed to a method to detect properties of the subsurface which utilizes the inelastic scattering of a component of primary electromagnetic waves or pulses in the subsurface, leading to the retransmission of frequencies different from the incident frequencies. Inelastic scattering occurs through the excitation of electromagnetic resonance states at characteristic frequencies, specific to the target material. The secondary electromagnetic pulses or waves are detected and analyzed to obtain information about the subsurface through its coupling strength.

In another exemplary aspect, the present disclosure is directed to a method, where the pulse shape or waveform is designed to reach a certain depth and/or spectrally shaped for a specific target.

In another exemplary aspect, the present disclosure is directed to a method, whereas the coupling between the electromagnetic wave and geology is due to the conversion of electromagnetic to vibrational and back to electromagnetic energy.

In another exemplary aspect, the present disclosure is directed to a method, whereas the coupling between the electromagnetic wave and geology is due to induced polarization between layers with different dielectric permittivity.

In another exemplary aspect, the present disclosure is directed to a method, where the secondary waves or pulses are detected by at least one surface receiver.

In another exemplary aspect, the present disclosure is directed to a method, where an image of the subsurface is reconstructed by a 2D- or 3D-array of surface receivers.

In another exemplary aspect, the present disclosure is directed to a method, where the secondary waves or pulses are detected by at least one downhole receiver.

In another exemplary aspect, the present disclosure is directed to a method, where an image of the subsurface is reconstructed using individual 1D displays starting at the source location and deformed so as to be orthogonal to the assumed structure.

In another exemplary aspect, the present disclosure is directed to a method of achieving enhanced subsurface penetration of electromagnetic waves using tuning effects between a receiver coil and a source system with ground coupling.

In another exemplary aspect, the present disclosure is directed to a method of interpreting the received electromagnetic signals to infer the potential presence of hydrocarbons from the presence of high frequency, dispersed energy at certain two way travel times, to indicate the potential presence of hydrocarbons and other materials.

In another exemplary aspect, the present disclosure is directed to a method of processing received electromagnetic signals to extract attributes highlighting variations in the received response from multiple pulses transmitted over a short time period. These variations, and the time at which they are observed, are characteristic of the presence of water, brine, caverns or other subsurface materials at the depth inferred by the time at which the variation is observed.

In another exemplary aspect, the present disclosure is directed to a method, in which recordings made by receivers located at varying offsets from the source are used to estimated propagation velocity and thus reflector depth.

In another exemplary aspect, the present disclosure is directed to a method, in which the instruments are mounted in a trailer, sled or other mobile recording platform in order to facilitate accelerated recording of profiles.

In another exemplary aspect, the present disclosure is directed to a method of deploying one or more 2D arrays of EM sensors above the boundary of a zone into which fluid is pumped. The array is used to indicate the time at which the pumped material reaches the boundary, and pumping may be terminated.

In another exemplary aspect, the present disclosure is directed to a method, in which the signal is processed to extract a characteristic time-domain variation in an electromagnetic pulse by performing a Hilbert transform or other filtering of the data, displaying the resultant instantaneous phase, frequency, amplitude and other attributes.

In another exemplary aspect, the present disclosure is directed to a method, where the processing of the data is performed using a Hilbert transform to extract hydrocarbon and other material signatures.

In another exemplary aspect, the present disclosure is directed to a method, where a known time domain pattern is extracted from the high-frequency modulation using a matched pattern filter, which was either determined in the lab or through empirical field tests, by matching observed data to known subsurface anomalies.

In another exemplary aspect, the present disclosure is directed to a method, where the processing of the data is performed using a processing workflow which includes the standard deviation of different traces acquired with identical source waveforms.

The foregoing figures and discussion are not intended to include all features of the present techniques to accommodate a buyer or seller, or to describe the system, nor is such figures and discussion limiting but exemplary and in the spirit of the present techniques.

What is claimed is:

1. A method for detecting formation properties comprising:
disposing a transmitter at a surface;
disposing a receiver at the surface;
coupling a high frequency wave to a low frequency wave to form an electromagnetic pulse;
shaping the electromagnetic pulse, wherein shaping the electromagnetic pulse depends on the depth of the subterranean formation and the subterranean formation properties;
transmitting the electromagnetic pulse into a subterranean formation from the transmitter;
receiving a reflected electromagnetic wave from the subterranean formation with the receiver; and
determining the depth and nature of the subterranean formation from the surface.

2. The method of claim 1, wherein the reflected electromagnetic wave is a retransmission of the reflected electromagnetic wave at frequencies different from the frequencies contained in the incident electromagnetic wave.

3. The method of claim 2, wherein the reflected electromagnetic wave is formed through inelastic scattering of the incident wave that is specific to the subterranean formation.

4. The method of claim 2, wherein the reflected electromagnetic wave is formed through the coupling between the reflected electromagnetic wave and a geology of the subterranean formation such that acoustic vibrational energy is created within the subterranean formation which in turn generates a secondary electromagnetic wave which may return to the surface containing frequencies different to those of the incident wave.

5. The method of claim 1, further comprising identifying a composition of the subterranean formation from the amplitudes of multiple frequencies contained within the reflected electromagnetic wave.

6. The method of claim 5, wherein the reflected electromagnetic wave is formed from discontinuities in complex resistivity or permittivity.

7. The method of claim 1, further comprising analyzing the reflected electromagnetic wave in a time-domain reflectometry mode.

8. The method of claim 7, further comprising determining the subterranean formation properties from the time-domain reflectometry mode.

9. A method for monitoring an injection of a fluid into a formation comprising:
disposing a plurality of remote collection stations on a surface;
disposing a subterranean transmitter on the surface;
coupling a high frequency wave to a low frequency wave to form an electromagnetic pulse;
transmitting the electromagnetic pulse into the subterranean formation from the transmitter;
receiving a reflected electromagnetic wave from the subterranean formation with the plurality of remote collection stations;
recording a first location of the fluid in the subterranean formation;
transmitting the electromagnetic pulse into the subterranean formation from the transmitter a second time;
receiving a reflected electromagnetic wave from the subterranean nation with the plurality of remote collection stations a second time;
recording the second location of the fluid in the subterranean formation;
determining movement of the fluid from the first location and the second location.

10. The method of claim 9, further comprising displaying the movement of the fluid from the first location and the second location in near real time on an analysis unit.

11. A formation measuring system comprising:
a transmitter, wherein the transmitter is configured to couple a high frequency wave to a low frequency wave to form an electromagnetic pulse;
at least one receiver;
a data acquisition system; and
an analysis unit, wherein the analysis unit is configured to determine the movement of a fluid in a formation and display the movement of the fluid in the formation in near real time.

12. The formation measuring system of claim 11, wherein the receiver is a loop or a coil.

13. The formation measuring system of claim 11, further comprising a digitizer, wherein the digitizer is disposed in the data acquisition system and enables discretization and quantization of recorded data from the receiver.

14. The formation measuring system of claim 11, further comprising a communication unit that is attached to at least one receiver.

15. The formation measuring system of claim 11, wherein the transmitter comprises a ground coupling, wherein the ground coupling is an electrode, an inductive loop, or a base plate.

16. The formation measuring system of claim 11, wherein the formation measuring system is disposed in a trailer, a sled, or a mobile platform.

17. The formation measuring system of claim 11, wherein the analysis unit is further configured to extract a time domain pattern with a pattern filter and wherein the pattern filter is found in a lab, empirical field tests, or observed data.

18. The formation measuring system of claim 11, further comprising a visual display wherein an image of the formation is displayed in a 2D image or 3D image.

* * * * *